US012606573B2

(12) United States Patent
Kuttner

(10) Patent No.: US 12,606,573 B2
(45) Date of Patent: Apr. 21, 2026

(54) PROCESS FOR BORON-CONTAINING COMPOUNDS

(71) Applicant: Venatorx Pharmaceuticals, Inc., Malvern, PA (US)

(72) Inventor: Julian Rudolf Kuttner, Hessen (DE)

(73) Assignee: VENATORX PHARMACEUTICALS, INC., Malvern, PA (US)

( * ) Notice: Subject to any disclaimer, the term of this patent is extended or adjusted under 35 U.S.C. 154(b) by 400 days.

(21) Appl. No.: 18/248,176

(22) PCT Filed: Aug. 5, 2021

(86) PCT No.: PCT/US2021/044808

§ 371 (c)(1),
(2) Date: Apr. 6, 2023

(87) PCT Pub. No.: WO2022/076070

PCT Pub. Date: Apr. 14, 2022

(65) Prior Publication Data

US 2024/0092807 A1 Mar. 21, 2024

Related U.S. Application Data

(60) Provisional application No. 63/088,872, filed on Oct. 7, 2020.

(51) Int. Cl.
*C07F 5/05* (2006.01)
*C07F 5/02* (2006.01)

(52) U.S. Cl.
CPC .................................... *C07F 5/025* (2013.01)

(58) Field of Classification Search
CPC ....................................................... C07F 5/025
See application file for complete search history.

(56) References Cited

U.S. PATENT DOCUMENTS

| | | | |
|---|---|---|---|
| 8,912,169 | B2 | 12/2014 | Burns et al. |
| 9,422,314 | B2 | 8/2016 | Burns et al. |
| 9,637,504 | B2 | 5/2017 | Burns et al. |
| 9,783,555 | B2 | 10/2017 | Burns et al. |
| 9,828,391 | B2 | 11/2017 | Burns et al. |
| 9,926,336 | B2 | 3/2018 | Burns et al. |
| 10,214,547 | B2 | 2/2019 | Burns et al. |
| 10,669,290 | B2 | 6/2020 | Burns et al. |
| 10,889,600 | B2 | 1/2021 | Amann et al. |
| 11,008,346 | B2 | 5/2021 | Burns et al. |
| 11,267,826 | B2 | 3/2022 | Burns et al. |
| 11,560,392 | B2 | 1/2023 | Amann et al. |
| 2010/0120715 | A1 | 5/2010 | Burns et al. |
| 2010/0286092 | A1 | 11/2010 | Burns et al. |
| 2010/0292185 | A1 | 11/2010 | Burns et al. |
| 2010/0317621 | A1 | 12/2010 | Burns et al. |
| 2019/0048027 | A1 | 2/2019 | Wu et al. |
| 2020/0095217 | A1 | 3/2020 | Dowdell et al. |
| 2020/0102331 | A1 | 4/2020 | Burns et al. |

FOREIGN PATENT DOCUMENTS

| | | | |
|---|---|---|---|
| CN | 105801610 | A | 7/2016 |
| CN | 106946924 | A | 7/2017 |
| WO | WO-2009064413 | A1 | 5/2009 |
| WO | WO-2009064414 | A1 | 5/2009 |
| WO | WO-2010056827 | A1 | 5/2010 |
| WO | WO-2010130708 | A1 | 11/2010 |
| WO | WO-2014089365 | A1 | 6/2014 |
| WO | WO-2015191907 | A1 | 12/2015 |
| WO | WO-2017044828 | A1 | 3/2017 |
| WO | WO-2018027062 | A1 | 2/2018 |
| WO | WO-2018218190 | A1 | 11/2018 |
| WO | WO-2022076070 | A1 | 4/2022 |

OTHER PUBLICATIONS

PCT/US2021/044808 International Search Report and Written Opinion dated Nov. 10, 2021.
Slocum et al. Metalation of o-methylanisole (o-MA); an optional-site selectivity reassessment. Tetrahedron 66(27-28):4939-4942 (2010).
Krajnc, Alen et al. Bicyclic boronate VNRX-5133 inhibits metallo- and serine-β-lactamases. Journal of Medicinal Chemistry 62(18):8544-8556 (2019).
Kurach, Pawel. et al. One-Pot Generation of Lithium (Lithiophenyl) trialkoxyborates from Substituted Dihalobenzenes (Hal=Br, I) and Their Derivatization with Electrophiles. European Journal of Organic Chemistry 2008(18):3171-3178 (2008).

*Primary Examiner* — Golam M Shameem
(74) *Attorney, Agent, or Firm* — WILSON SONSINI GOODRICH & ROSATI

(57) ABSTRACT

Described herein are boron-containing compounds, compositions, and methods for their preparation.

14 Claims, No Drawings

PROCESS FOR BORON-CONTAINING COMPOUNDS

CROSS-REFERENCE

This patent application is a national stage entry of PCT/US2021/044808, filed on Aug. 5, 2021, which claims the benefit of U.S. Provisional Application No. 63/088,872, filed Oct. 7, 2020; which are hereby incorporated by reference in their entirety.

STATEMENT AS TO FEDERALLY SPONSORED RESEARCH

This invention was made with the support of the United States government under Contract number HHSN272201600029C by the National Institute for Health/National Institutes of Allergy and Infectious diseases. The government has certain rights in the invention.

BACKGROUND OF THE INVENTION

The present invention relates to boron-containing compounds, and methods for their preparation. Said compounds and pharmaceutical compositions comprising said compounds are useful as inhibitors of beta-lactamase enzymes and as antibacterial agents.

SUMMARY OF THE INVENTION

Disclosed herein is a process for preparing a compound of Formula (III):

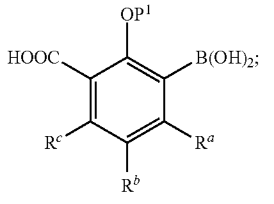

wherein:

$P^1$ is a hydroxyl protecting group; and $R^a$, $R^b$, and $R^c$ are independently hydrogen, fluoro, or chloro;

the process comprising reacting a compound of Formula (II):

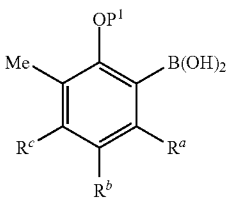

with an oxidizing agent.

In some embodiments, the oxidizing agent is potassium permanganate ($KMnO_4$). In some embodiments, the process further comprises a base.

In some embodiments, the process comprises:

(i) suspending the compound of Formula (II):

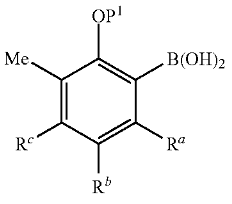

in water;

(ii) adding a base to dissolve the compound of Formula (II) in water;

(iii) adding an oxidizing agent while stirring;

(iv) stirring;

(v) adding a solvent to inactivate the excess oxidizing agent;

(vi) stirring;

(vii) filtering to get a filtrate;

(viii) acidifying the filtrate to get a slurry;

(viii) cooling the slurry; and (ix) filtering the slurry thereby obtaining the compound of Formula (III):

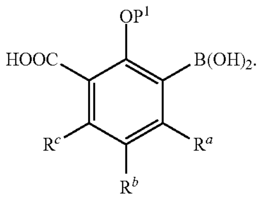

In some embodiments, the base in step (ii) is sodium hydroxide. In some embodiments, the oxidizing agent is potassium permanganate ($KMnO_4$). In some embodiments, step (iii) is performed for about 10 h to about 20 h. In some embodiments, step (iii) is performed for about 16 h. In some embodiments, the temperature is maintained at between about 20° C. and about 30° C. in step (iii). In some embodiments, the solvent to inactivate the excess oxidizing agent is a primary or secondary alcoholic solvent. In some embodiments, the solvent to inactivate the excess oxidizing agent is ethanol. In some embodiments, step (vi) is performed for about 10 min to about 2 h. In some embodiments, step (vi) is performed for about 30 min. In some embodiments, the filtrate obtained in step (vii) is cooled to between about 0° C. and about 10° C. in step (viii) prior to acidifying. In some embodiments, the filtrate is cooled to about 5° C. in step (viii) prior to acidifying. In some embodiments, the acid used for acidifying is sulfuric acid. In some embodiments, the compound of Formula (III) is obtained by filtration.

In some embodiments, the compound of Formula (II):

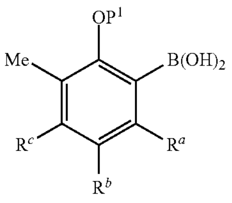

is obtained by reacting a compound of Formula (I):

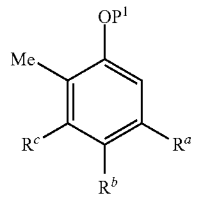

with a lithium reagent followed by a borate. In some embodiments, the compound of Formula (I) is contacted with the lithium reagent to form a compound of Formula (Ia):

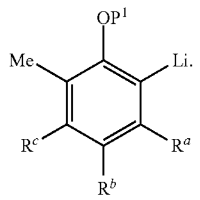

In some embodiments, the compound of Formula (Ia) is not isolated. In some embodiments, the compound of Formula (Ia) is further reacted with the borate to form the compound of Formula (II). In some embodiments, the lithium reagent is n-BuLi. In some embodiments, the borate is $B(OiPr)_3$.

In some embodiments, the process comprises:

(i) combining a compound of Formula (I):

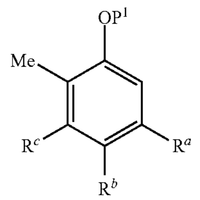

and a diamine in a solvent;

(ii) stirring;

(iii) adding a lithium reagent;

(iv) stirring;

(v) adding a borate;

(vi) quenching the reaction by adding an aqueous acidic solution;

(vii) separating the layers to obtain an organic layer;

(viii) adding an aqueous basic solution to the organic layer;

(ix) separating the layers to obtain an aqueous layer;

(x) adding an acid to the aqueous layer;

(xi) cooling to obtain a suspension;

(xii) stirring;

(xiii) filtering the suspension, thereby obtaining the compound of Formula (II):

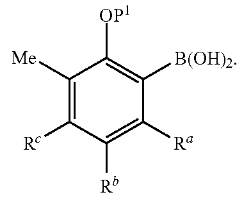

In some embodiments, the diamine is TMEDA. In some embodiments, the solvent use in step (i) is cyclohexane. In some embodiments, the lithium reagent is nBuLi.

In some embodiments, the borate is $B(OiPr)_3$. In some embodiments, the addition of the lithium reagent in step (iii) is done over about 1 h to about 6 h. In some embodiments, the addition of the lithium reagent in step (iii) is done while the temperature is maintained between about 0° C. and about 20° C. In some embodiments, step (iv) is performed for about 2 h to about 3 h. In some embodiments, the temperature is cooled to below −70° C. prior to the addition of the borate in step (v). In some embodiments, the temperature is warmed to above −20° C. after to the addition of the borate in step (v). In some embodiments, the aqueous acidic solution in step (vi) is a HCl solution. In some embodiments, the aqueous basic solution in step (viii) is a NaOH solution. In some embodiments, the cooling temperature in step (xi) is about 0° C. and about 5° C.

In some embodiments, wherein the process further comprises reacting the compound of Formula (III):

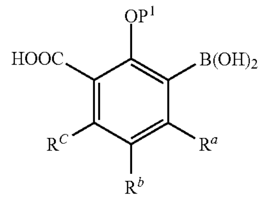

with (1S,2S,3R,5S)-(+)-pinanediol in a solvent to form a compound of Formula (IV):

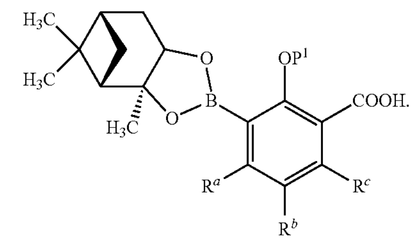

In some embodiments, the solvent is n-heptane.

In some embodiments, the process comprises:

(i) mixing the compound of Formula (III), (1S,2S,3R,5S)-(+)-pinanediol, and the solvent;

(ii) heating the resulting mixture;

(iii) cooling to obtain a slurry;

(iv) filtering to obtain the compound of Formula (IV).

In some embodiments, the solvent is n-heptane. In some embodiments, the heating is done to reach reflux. In some embodiments, step (ii) further comprises removing water. In some embodiments, the cooling temperature in step (iii) is below about 60° C.

Also disclosed herein is a process for preparing a compound of Formula (A):

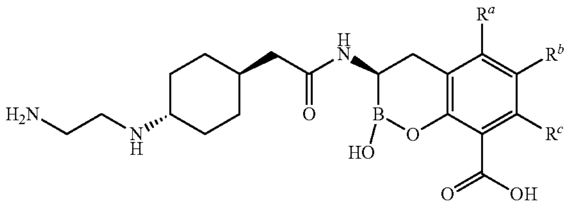

using a compound of Formula (III):

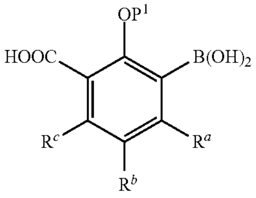

made from the process disclosed herein;

wherein:

$P^1$ is a hydroxyl protecting group; and $R^a$, $R^b$, and $R^c$ are independently hydrogen, fluoro, or chloro.

In some embodiments, the compound of Formula (III):

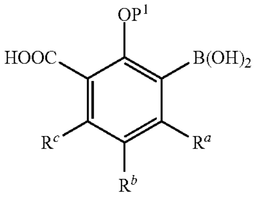

is reacted with (1S,2S,3R,5S)-(+)-pinanediol to form a compound of Formula (IV):

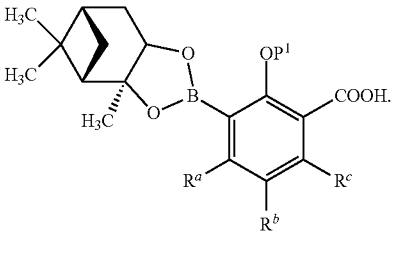

In some embodiments, the compound of Formula (IV):

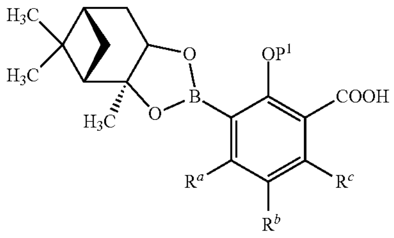

is reacted with a carboxyl protecting group to form a compound of Formula (V):

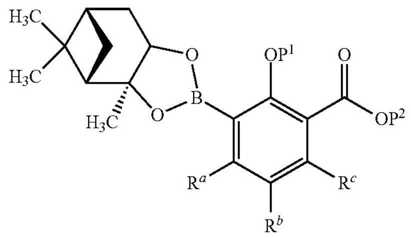

wherein $P^2$ is a carboxyl protecting group. In some embodiments, the carboxyl protecting reagent is $SOCl_2$ followed by NaOtBu.

In some embodiments, the compound of Formula (V):

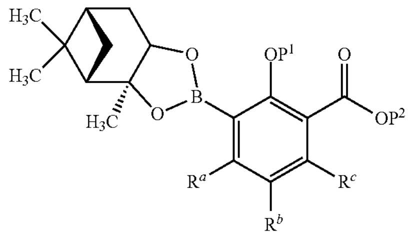

is reacted with chloroiodomethane and a hindered Grignard reagent to form a compound of Formula (VI):

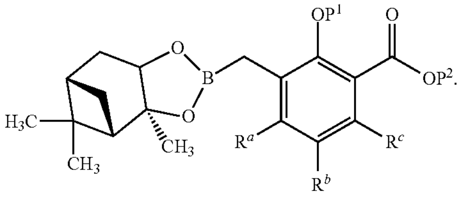

In some embodiments, the hindered Grignard reagent is isopropylmagnesium chloride, cyclohexylmagnesium chloride, or isopropylmagnesium chloride:lithium chloride. In some embodiments, the hindered Grignard reagent is isopropylmagnesium chloride:lithium chloride. In some embodiments, the compound of Formula (VI):

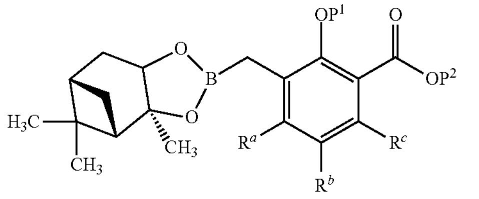

is reacted with dichloromethane and a base followed by a Lewis acid to for a compound of Formula (VII):

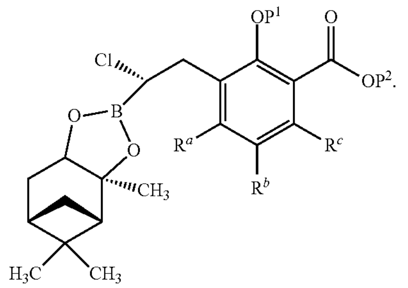

In some embodiments, the base is lithium diisopropylamide or 2,2,6,6-tetramethylpiperidinylmagnesium chloride: lithium chloride. In some embodiments, the base is lithium diisopropylamide.

In some embodiments, the Lewis acid is $ZnCl_2$. In some embodiments, the compound of Formula (VII):

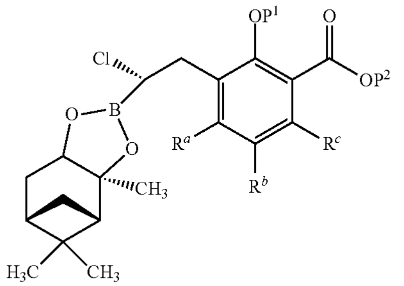

is reacted with a protected ammonium reagent to form a compound of Formula (VIII):

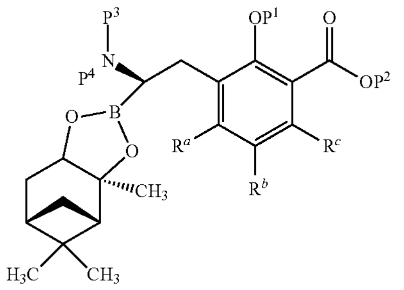

wherein $P^3$ and $P^4$ are amine protecting groups. In some embodiments, the protected ammonium reagent is a metal salt of hexaalkyldisilazane. In some embodiments, the compound of Formula (VIII):

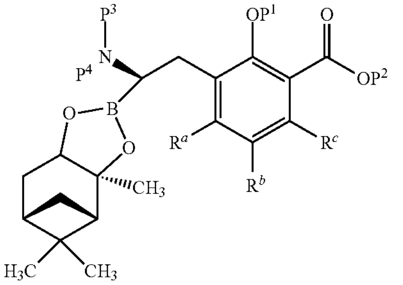

is reacted with

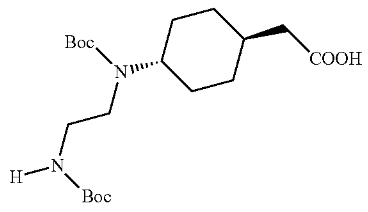 [SMILES: CC(C)(C)OC(=O)NCCN(C(=O)OC(C)(C)C)[C@H]1CC[C@H](CC(=O)O)CC1]

to form a compound of Formula (IX):

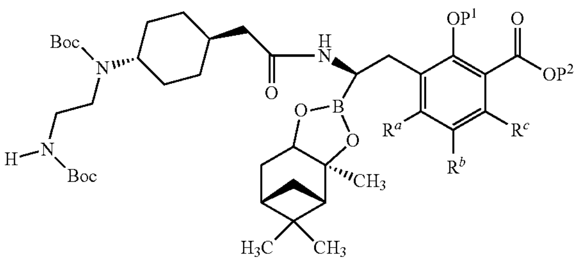

In some embodiments, the process further comprises a coupling reagent.

In some embodiments, the coupling reagent is HATU, EDC, HBTU, HCTU, HOBt, PyAOP, PyBOP, or TBTU. In some embodiments, the coupling reagent is HATU. In some embodiments, the compound of Formula (IX):

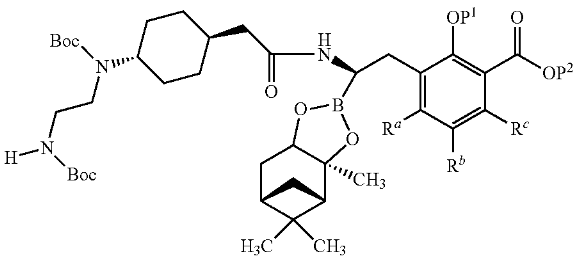

is reacted with an acid to form the compound of Formula (A):

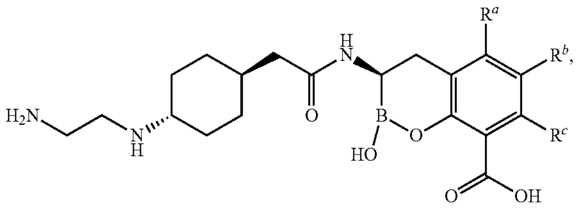

or a pharmaceutically acceptable salt thereof.

Also disclosed herein is a process for preparing a compound of Formula (B):

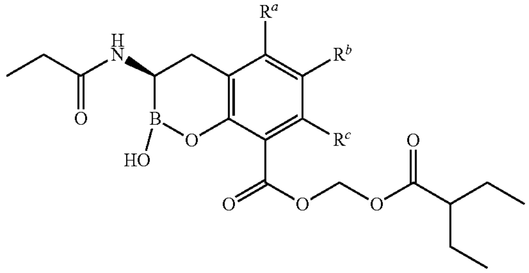

using a compound of Formula (III):

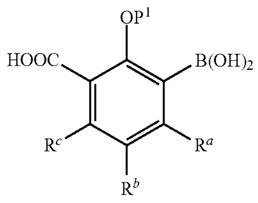

made from the process disclosed herein;

wherein:

$P^1$ is a hydroxyl protecting group; and $R^a$, $R^b$, and $R^c$ are independently hydrogen, fluoro, or chloro.

In some embodiments, the compound of Formula (III):

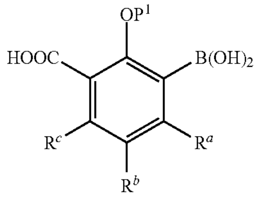

is reacted with (1S,2S,3R,5S)-(+)-pinanediol to form a compound of Formula (IV):

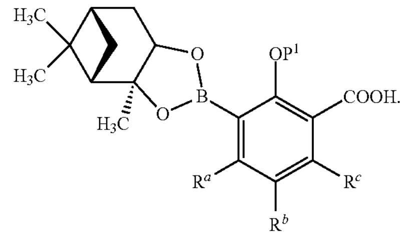

In some embodiments, the compound of Formula (IV):

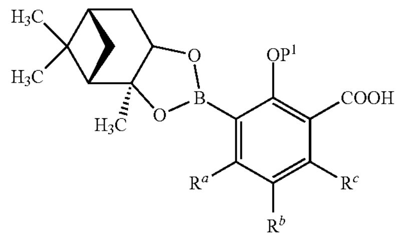

is reacted with a carboxyl protecting reagent to form a compound of Formula (V):

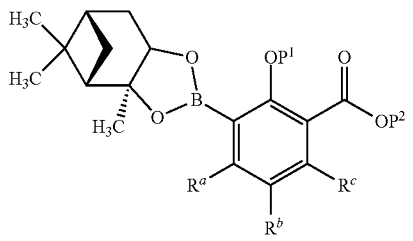

wherein $P^2$ is a carboxyl protecting group. In some embodiments, the carboxyl protecting reagent is $SOCl_2$ followed by NaOtBu. In some embodiments, the compound of Formula (V):

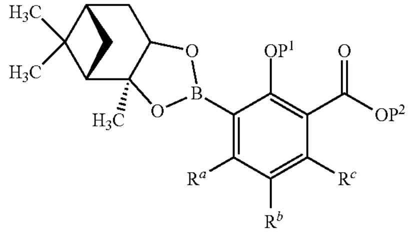

is reacted with chloroiodomethane and a hindered Grignard reagent to form a compound of Formula (VI):

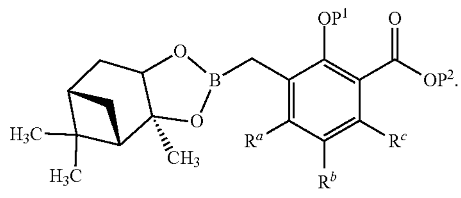

In some embodiments, the hindered Grignard reagent is isopropylmagnesium chloride, cyclohexylmagnesium chloride, or isopropylmagnesium chloride:lithium chloride. In some embodiments, the hindered Grignard reagent is isopropylmagnesium chloride:lithium chloride. In some embodiments, the compound of Formula (VI):

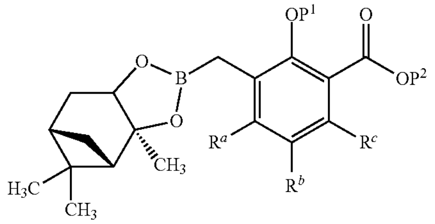

is reacted with dichloromethane and a base followed by a Lewis acid to for a compound of Formula (VII):

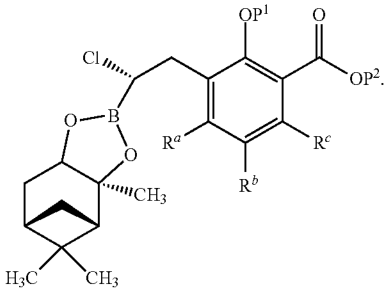

In some embodiments, the base is lithium diisopropylamide or 2,2,6,6-tetramethylpiperidinylmagnesium chloride: lithium chloride. In some embodiments, the base is lithium diisopropylamide. In some embodiments, the Lewis acid is $ZnCl_2$. In some embodiments, the compound of Formula (VII):

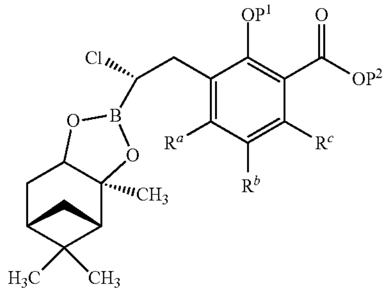

is reacted with a protected ammonium reagent to form a compound of Formula (VIII):

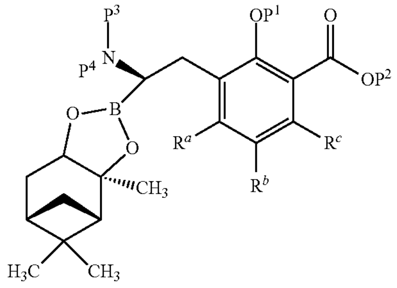

wherein $P^3$ and $P^4$ are amine protecting groups. In some embodiments, the protected ammonium reagent is a metal salt of hexaalkyldisilazane. In some embodiments, the compound of Formula (VIII):

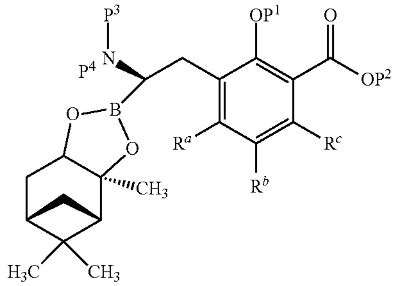

is reacted with EtC(=O)Cl to form a compound of Formula (X):

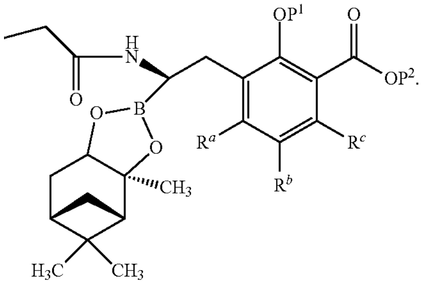

In some embodiments, the compound of Formula (X):

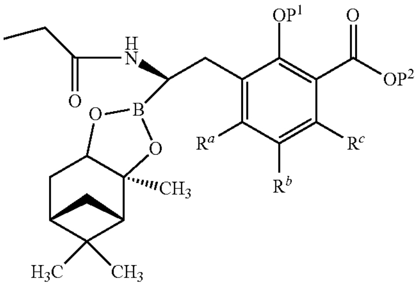

is reacted with a deprotecting agent to form a compound of Formula (XI):

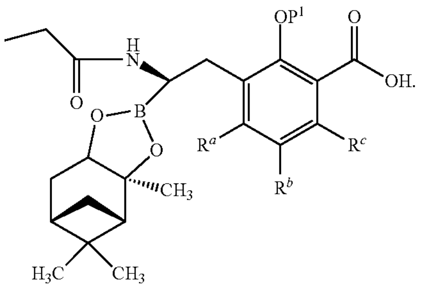

In some embodiments, the deprotecting agent is methanesulfonic acid. In some embodiments, the compound of Formula (XI):

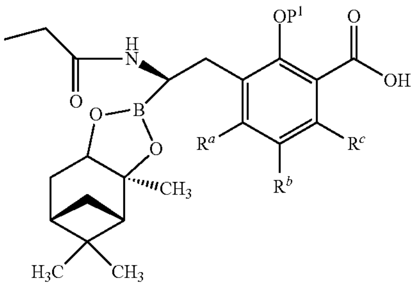

is reacted with

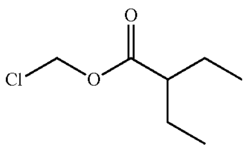

to form a compound of Formula (XII):

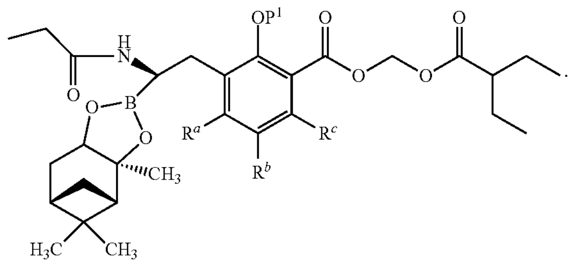

In some embodiments, the compound of Formula (XII):

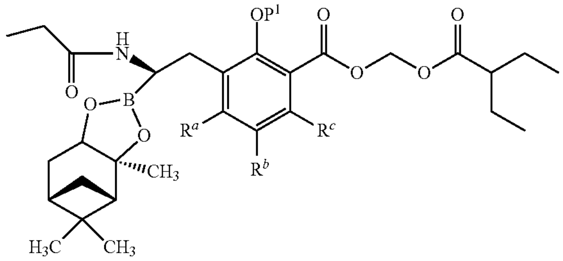

is reacted with propionyl chloride in the presence of an alkali metal or quaternary ammonium salt of bromine or iodine to form a compound of Formula (B):

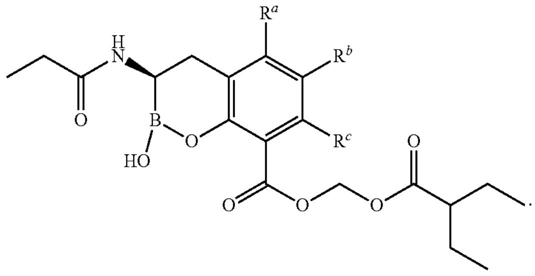

In some embodiments, the alkali metal salt of bromine is LiBr. In some embodiments, the compound of Formula (B):

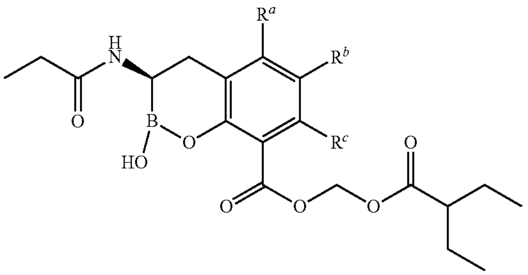

is reacted with $R^1$—OH to form a compound of Formula (C):

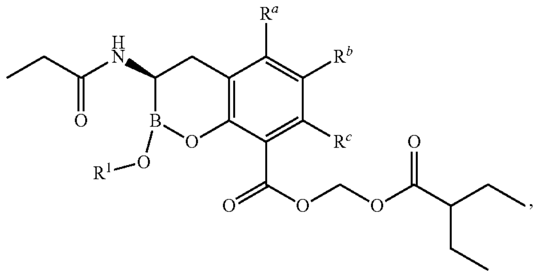

wherein $R^1$ is optionally substituted $C_1$-$C_6$ alkyl, optionally substituted $C_1$-$C_6$ haloalkyl, optionally substituted $C_1$-$C_6$ hydroxyalkyl, optionally substituted $C_1$-$C_6$ aminoalkyl, optionally substituted $C_1$-$C_6$ deuteroalkyl, optionally substituted $C_1$-$C_6$ heteroalkyl, optionally substituted $C_2$-$C_6$ alkenyl, optionally substituted $C_2$-$C_6$ alkynyl, optionally substituted cycloalkyl, optionally substituted heterocycloalkyl, optionally substituted ($C_1$-$C_6$ alkyl)cycloalkyl, optionally substituted ($C_1$-$C_6$ alkyl)heterocycloalkyl, optionally substituted ($C_1$-$C_6$ alkyl)aryl, or optionally substituted ($C_1$-$C_6$ alkyl)heteroaryl.

In some embodiments, $P^1$ is $C_1$-$C_6$ alkyl. In some embodiments, $P^1$ is methyl. In some embodiments, $R^a$, $R^b$, and $R^c$ are independently hydrogen or fluoro. In some embodiments, $R^a$, $R^b$, and $R^c$ are hydrogen. In some embodiments, $R^a$ is halogen. In some embodiments, $R^b$ is halogen. In some embodiments, $R^c$ is halogen. In some embodiments, $P^2$ is $C_1$-$C_6$ alkyl. In some embodiments, $P^2$ is tert-butyl. In some embodiments, $P^3$ and $P^4$ are trimethylsilyl. In some embodiments, $R^1$ is optionally substituted $C_1$-$C_6$ alkyl, optionally substituted $C_1$-$C_6$ haloalkyl, or optionally substituted $C_1$-$C_6$ deuteroalkyl. In some embodiments, $R^1$ is optionally substituted $C_1$-$C_6$ alkyl. In some embodiments, $R^1$ is $C_1$-$C_6$ alkyl. In some embodiments, $R^1$ is ethyl. In some embodiments, the compound of Formula (A) is

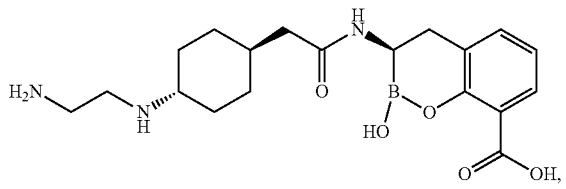 [SMILES: NCCN[C@H]1CC[C@H](CC(=O)N[C@H]2Cc3cccc(C(=O)O)c3OB2O)CC1]

or a pharmaceutically acceptable salt thereof. In some embodiments, the compound of Formula (B) is

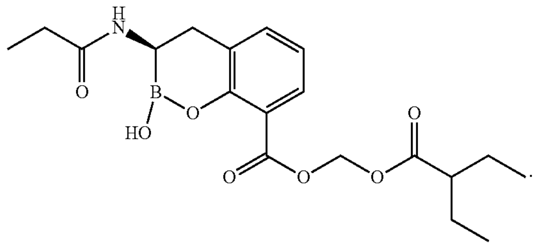 [SMILES: CCC(=O)N[C@H]1Cc2cccc(C(=O)OCOC(=O)C(CC)CC)c2OB1O]

In some embodiments, the compound of Formula (C) is

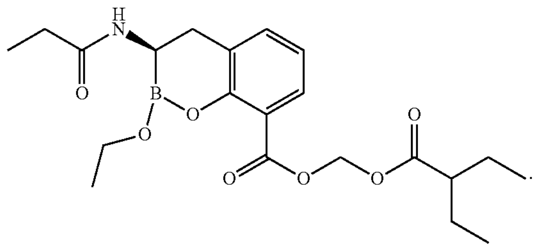 [SMILES: CCOB1Oc2c(cccc2C(=O)OCOC(=O)C(CC)CC)C[C@@H]1NC(=O)CC]

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION OF THE INVENTION

Antibiotics are the most effective drugs for the clinical treatment of bacterial infections. They are in common use due to their advantages of good antibacterial effect with limited side effects. Among them, the beta-lactam class of antibiotics (for example, penicillins, cephalosporins, and carbapenems) is widely used because they have a strong bactericidal effect and low toxicity.

To counter the efficacy of the various beta-lactams antibiotics, bacteria have evolved to produce deactivating enzymes, called beta-lactamases, which act upon beta-lactam substrates. These beta-lactamases are categorized as "serine" or "metallo" based, respectively, on presence of a key serine or zinc in the enzyme active site. The rapid spread of this mechanism of bacterial resistance can severely limit beta-lactam treatment options in the hospital and in the community. To combat this type of resistant bacteria, inhibitors of beta-lactamase have been developed which restore the effectiveness of the beta-lactam class of antibiotics when administered in combination. Thus the discovery of new beta-lactamase inhibitors has become a focus of efforts for the discovery and development of new anti-bacterial therapies.

Good manufacturing practices are usually required for large scale manufacture of clinically useful drug candidates. Provided herein are certain processes and methods for the manufacture of new beta-lactamase inhibitors, or intermediates for the synthesis thereof.

Definitions

As used in the specification and appended claims, unless specified to the contrary, the following terms have the meaning indicated below.

As used herein and in the appended claims, the singular forms "a," "an," and "the" include plural referents unless the context clearly dictates otherwise.

When ranges are used herein for physical properties, such as molecular weight, or chemical properties, such as chemical formulae, all combinations and subcombinations of ranges and specific embodiments therein are intended to be included.

The term "about" when referring to a number or a numerical range means that the number or numerical range referred to is an approximation within experimental variability (or within statistical experimental error), and thus the number or numerical range varies between 1% and 15% of the stated number or numerical range.

The term "comprising" (and related terms such as "comprise" or "comprises" or "having" or "including") is not intended to exclude that which in other certain embodiments, for example, an embodiment of any composition of matter, composition, method, or process, or the like, described herein, "consist of" or "consist essentially of" the described features.

As used herein, "treatment" or "treating" or "palliating" or "ameliorating" are used interchangeably herein. These terms refers to an approach for obtaining beneficial or desired results including but not limited to therapeutic benefit and/or a prophylactic benefit. By "therapeutic benefit" is meant eradication or amelioration of the underlying disorder being treated. Also, a therapeutic benefit is achieved with the eradication or amelioration of one or more of the physiological symptoms associated with the underlying disorder such that an improvement is observed in the patient, notwithstanding that the patient is still afflicted with the underlying disorder. For prophylactic benefit, the compositions are administered to a patient at risk of developing a particular disease, or to a patient reporting one or more of the physiological symptoms of a disease, even though a diagnosis of this disease has been made.

As used herein, "room temperature" means 25±5° C. In some embodiments, room temperature is 20° C. In some embodiments, room temperature is 21° C. In some embodiments, room temperature is 22° C. In some embodiments, room temperature is 23° C. In some embodiments, room temperature is 24° C. In some embodiments, room temperature is 25° C. In some embodiments, room temperature is 26° C. In some embodiments, room temperature is 27° C. In some embodiments, room temperature is 28° C. In some embodiments, room temperature is 29° C. In some embodiments, room temperature is 30° C.

"Alkyl" refers to an optionally substituted straight-chain, or optionally substituted branched-chain saturated hydrocarbon monoradical having from one to about ten carbon atoms, or from one to six carbon atoms, wherein a sp3-hybridized carbon of the alkyl residue is attached to the rest of the molecule by a single bond. Examples include, but are not limited to, methyl, ethyl, n-propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, n-butyl, isobutyl, sec-butyl, t-butyl, n-pentyl, isopentyl, neopentyl, tert-amyl and hexyl, and longer alkyl groups, such as heptyl, octyl, and the like. Whenever it appears herein, a numerical range such as "$C_1$-$C_6$ alkyl" means that the alkyl group consists of 1 carbon atom, 2 carbon atoms, 3 carbon atoms, 4 carbon atoms, 5 carbon atoms or 6 carbon atoms, although the present definition also covers the occurrence of the term "alkyl" where no numerical range is designated. In some embodiments, the alkyl is a $C_1$-$C_{10}$ alkyl, a $C_1$-$C_9$ alkyl, a $C_1$-$C_5$ alkyl, a $C_1$-$C_7$ alkyl, a $C_1$-$C_6$ alkyl, a $C_1$-$C_5$ alkyl, a $C_1$-$C_4$ alkyl, a $C_1$-$C_3$ alkyl, a $C_1$-$C_2$ alkyl, or a $C_1$ alkyl. Unless stated otherwise specifically in the specification, an alkyl group is optionally substituted as described below, for example, with oxo, halogen, amino, nitrile, nitro, hydroxyl, haloalkyl, alkoxy, aryl, cycloalkyl, heterocycloalkyl, heteroaryl, and the like. In some embodiments, the alkyl is optionally substituted with oxo, halogen, —CN, —$CF_3$, —OH, —OMe, —$NH_2$, or —$NO_2$. In some embodiments, the alkyl is optionally substituted with oxo, halogen, —CN, —$CF_3$, —OH, or —OMe.

"Alkoxy" refers to a radical of the formula —$OR_a$ where $R_a$ is an alkyl radical as defined. Unless stated otherwise specifically in the specification, an alkoxy group may be optionally substituted as described below, for example, with oxo, halogen, amino, nitrile, nitro, hydroxyl, haloalkyl, alkoxy, aryl, cycloalkyl, heterocycloalkyl, heteroaryl, and the like. In some embodiments, an alkoxy is optionally substituted with oxo, halogen, —CN, —$CF_3$, —OH, —OMe, —$NH_2$, or —$NO_2$. In some embodiments, an alkoxy is optionally substituted with oxo, halogen, —CN, —$CF_3$, —OH, or —OMe.

"Alkenyl" refers to an optionally substituted straight-chain, or optionally substituted branched-chain hydrocarbon monoradical having one or more carbon-carbon double-bonds and having from two to about ten carbon atoms, more preferably two to about six carbon atoms. The group may be in either the cis or trans conformation about the double bond(s), and should be understood to include both isomers. Examples include, but are not limited to, ethenyl (—CH═$CH_2$), 1-propenyl (—$CH_2$CH═$CH_2$), isopropenyl [—C($CH_3$)═$CH_2$], butenyl, 1,3-butadienyl and the like. Whenever it appears herein, a numerical range such as "$C_2$-$C_6$ alkenyl" means that the alkenyl group may consist of 2 carbon atoms, 3 carbon atoms, 4 carbon atoms, 5 carbon atoms or 6 carbon atoms, although the present definition also covers the occurrence of the term "alkenyl" where no numerical range is designated. In some embodiments, the alkenyl is a $C_2$-$C_{10}$ alkenyl, a $C_2$-$C_9$ alkenyl, a $C_2$-$C_5$ alkenyl, a $C_2$-$C_7$ alkenyl, a $C_2$-$C_6$ alkenyl, a $C_2$-$C_5$ alkenyl, a $C_2$-$C_4$ alkenyl, a $C_2$-$C_3$ alkenyl, or a $C_2$ alkenyl. Unless stated otherwise specifically in the specification, an alkenyl group is optionally substituted, for example, with oxo, halogen, amino, nitrile, nitro, hydroxyl, haloalkyl, alkoxy, aryl, cycloalkyl, heterocycloalkyl, heteroaryl, and the like. In some embodiments, an alkenyl is optionally substituted with oxo, halogen, —CN, —$CF_3$, —OH, —OMe, —$NH_2$, or —$NO_2$. In some embodiments, an alkenyl is optionally substituted with oxo, halogen, —CN, —$CF_3$, —OH, or —OMe. In some embodiments, the alkenyl is optionally substituted with halogen.

"Alkynyl" refers to an optionally substituted straight-chain or optionally substituted branched-chain hydrocarbon monoradical having one or more carbon-carbon triple-bonds and having from two to about ten carbon atoms, more preferably from two to about six carbon atoms. Examples include, but are not limited to, ethynyl, 2-propynyl, 2-butynyl, 1,3-butadiynyl and the like. Whenever it appears herein, a numerical range such as "$C_2$-$C_6$ alkynyl" means that the alkynyl group may consist of 2 carbon atoms, 3 carbon atoms, 4 carbon atoms, 5 carbon atoms or 6 carbon atoms, although the present definition also covers the occurrence of the term "alkynyl" where no numerical range is designated. In some embodiments, the alkynyl is a $C_2$-$C_{10}$ alkynyl, a $C_2$-$C_9$ alkynyl, a $C_2$-$C_8$ alkynyl, a $C_2$-$C_7$ alkynyl, a $C_2$-$C_6$ alkynyl, a $C_2$-$C_5$ alkynyl, a $C_2$-$C_4$ alkynyl, a $C_2$-$C_3$ alkynyl, or a $C_2$ alkynyl. Unless stated otherwise specifically in the specification, an alkynyl group is optionally substituted, for example, with oxo, halogen, amino, nitrile, nitro, hydroxyl, haloalkyl, alkoxy, aryl, cycloalkyl, heterocycloalkyl, heteroaryl, and the like. In some embodiments, an alkynyl is optionally substituted with oxo, halogen, —CN, —$CF_3$, —OH, —OMe, —$NH_2$, or —$NO_2$. In some embodiments, an alkynyl is optionally substituted with oxo, halogen, —CN, —$CF_3$, —OH, or —OMe. In some embodiments, the alkynyl is optionally substituted with halogen.

"Deuteroalkyl" refers to an alkyl radical, as defined above, that is substituted by one or more deuterium atoms. In some embodiments, the alkyl is substituted with one deuterium atom. In some embodiments, the alkyl is substituted with one, two, or three deuterium atoms. In some embodiments, the alkyl is substituted with one, two, three, four, five, or six deuterium atoms. Deuteroalkyl includes, for example, $CD_3$, $CH_2D$, $CHD_2$, $CH_2CD_3$, $CD_2CD_3$, $CHDCD_3$, $CH_2CH_2D$, or $CH_2CHD_2$. In some embodiments, the deuteroalkyl is $CD_3$.

"Haloalkyl" refers to an alkyl radical, as defined above, that is substituted by one or more halogen atoms. In some embodiments, the alkyl is substituted with one, two, or three halogen atoms. In some embodiments, the alkyl is substituted with one, two, three, four, five, or six halogen halogens. Haloalkyl includes, for example, trifluoromethyl, difluoromethyl, fluoromethyl, trichloromethyl, 2,2,2-trifluoroethyl, 1,2-difluoroethyl, 3-bromo-2-fluoropropyl, 1,2-dibromoethyl, and the like. In some embodiments, the haloalkyl is trifluoromethyl.

"Heteroalkyl" refers to an alkyl group in which one or more skeletal atoms of the alkyl are selected from an atom other than carbon, e.g., oxygen, nitrogen (e.g., —NH—, —N(alkyl)-), sulfur, or combinations thereof. A heteroalkyl is attached to the rest of the molecule at a carbon atom of the heteroalkyl. In one aspect, a heteroalkyl is a $C_1$-$C_6$ heteroalkyl wherein the heteroalkyl is comprised of 1 to 6 carbon atoms and one or more atoms other than carbon, e.g., oxygen, nitrogen (e.g. —NH—, —N(alkyl)-), sulfur, or combinations thereof wherein the heteroalkyl is attached to the rest of the molecule at a carbon atom of the heteroalkyl. Examples of such heteroalkyl are, for example, $—CH_2OCH_3$, $—CH_2CH_2OCH_3$, $—CH_2CH_2OCH_2CH_2OCH_3$, or $—CH(CH_3)OCH_3$. Unless stated otherwise specifically in the specification, a heteroalkyl is optionally substituted for example, with oxo, halogen, amino, nitrile, nitro, hydroxyl, alkyl, alkenyl, alkynyl, haloalkyl, alkoxy, aryl, cycloalkyl, heterocycloalkyl, heteroaryl, and the like. In some embodiments, a heteroalkyl is optionally substituted with oxo, halogen, methyl, ethyl, —CN, $—CF_3$, —OH, —OMe, $—NH_2$, or $—NO_2$. In some embodiments, a heteroalkyl is optionally substituted with oxo, halogen, methyl, ethyl, —CN, $—CF_3$, —OH, or —OMe. In some embodiments, the heteroalkyl is optionally substituted with halogen.

"Hydroxyalkyl" refers to an alkyl radical, as defined above, that is substituted by one or more hydroxyls. In some embodiments, the alkyl is substituted with one hydroxyl. In some embodiments, the alkyl is substituted with one, two, or three hydroxyls. Hydroxyalkyl include, for example, hydroxymethyl, hydroxyethyl, hydroxypropyl, hydroxybutyl, or hydroxypentyl. In some embodiments, the hydroxyalkyl is hydroxymethyl.

"Aminoalkyl" refers to an alkyl radical, as defined above, that is substituted by one or more amino groups. In some embodiments, the alkyl is substituted with one amino group. In some embodiments, the alkyl is substituted with one, two, or three amino groups. Hydroxyalkyl include, for example, aminomethyl, aminoethyl, aminopropyl, aminobutyl, or aminopentyl. In some embodiments, the hydroxyalkyl is aminomethyl.

"Aryl" refers to a radical derived from a hydrocarbon ring system comprising hydrogen, 6 to 30 carbon atoms and at least one aromatic ring. The aryl radical may be a monocyclic, bicyclic, tricyclic or tetracyclic ring system, which may include fused (when fused with a cycloalkyl or heterocycloalkyl ring, the aryl is bonded through an aromatic ring atom) or bridged ring systems. In some embodiments, the aryl is a 6- to 10-membered aryl. In some embodiments, the aryl is a 6-membered aryl. Aryl radicals include, but are not limited to, aryl radicals derived from the hydrocarbon ring systems of anthrylene, naphthylene, phenanthrylene, anthracene, azulene, benzene, chrysene, fluoranthene, fluorene, as-indacene, s-indacene, indane, indene, naphthalene, phenalene, phenanthrene, pleiadene, pyrene, and triphenylene. In some embodiments, the aryl is phenyl. Unless stated otherwise specifically in the specification, an aryl may be optionally substituted as described below, for example, with halogen, amino, nitrile, nitro, hydroxyl, alkyl, haloalkyl, alkoxy, aryl, cycloalkyl, heterocycloalkyl, heteroaryl, and the like. In some embodiments, an aryl is optionally substituted with halogen, methyl, ethyl, —CN, $—CF_3$, —OH, —OMe, $—NH_2$, or $—NO_2$. In some embodiments, an aryl is optionally substituted with halogen, methyl, ethyl, —CN, $—CF_3$, —OH, or —OMe.

"Cycloalkyl" refers to a stable, partially, or fully saturated, monocyclic or polycyclic carbocyclic ring, which may include fused (when fused with an aryl or a heteroaryl ring, the cycloalkyl is bonded through a non-aromatic ring atom) or bridged ring systems. Representative cycloalkyls include, but are not limited to, cycloalkyls having from three to fifteen carbon atoms ($C_3$-$C_{15}$ cycloalkyl), from three to ten carbon atoms ($C_3$-$C_{10}$ cycloalkyl), from three to eight carbon atoms ($C_3$-$C_8$ cycloalkyl), from three to six carbon atoms ($C_3$-$C_6$ cycloalkyl), from three to five carbon atoms ($C_3$-$C_5$ cycloalkyl), or three to four carbon atoms ($C_3$-$C_4$ cycloalkyl). In some embodiments, the cycloalkyl is a 3- to 6-membered cycloalkyl. In some embodiments, the cycloalkyl is a 5- to 6-membered cycloalkyl. Monocyclic cycloalkyls include, for example, cyclopropyl, cyclobutyl, cyclopentyl, cyclohexyl, cycloheptyl, and cyclooctyl. Polycyclic cycloalkyls or carbocycles include, for example, adamantyl, norbornyl, decalinyl, bicyclo[3.3.0]octane, bicyclo[4.3.0]nonane, cis-decalin, trans-decalin, bicyclo[2.1.1]hexane, bicyclo[2.2.1]heptane, bicyclo[2.2.2]octane, bicyclo[3.2.2]nonane, bicyclo[3.3.2]decane, and 7,7-dimethyl-bicyclo[2.2.1]heptanyl. Partially saturated cycloalkyls include, for example cyclopentenyl, cyclohexenyl, cycloheptenyl, and cyclooctenyl. Unless stated otherwise specifically in the specification, a cycloalkyl is optionally substituted as described below, for example, with oxo, halogen, amino, nitrile, nitro, hydroxyl, alkyl, haloalkyl, alkoxy, aryl, cycloalkyl, heterocycloalkyl, heteroaryl, and the like. In some embodiments, a cycloalkyl is optionally substituted with oxo, halogen, methyl, ethyl, —CN, $—CF_3$, —OH, —OMe, $—NH_2$, or $—NO_2$. In some embodiments, a cycloalkyl is optionally substituted with oxo, halogen, methyl, ethyl, —CN, $—CF_3$, —OH, or —OMe.

"Halo" or "halogen" refers to bromo, chloro, fluoro, or iodo. In some embodiments, halogen is fluoro or chloro. In some embodiments, halogen is fluoro.

"Haloalkyl" refers to an alkyl radical, as defined above, that is substituted by one or more halo radicals, as defined above, e.g., trifluoromethyl, difluoromethyl, fluoromethyl, trichloromethyl, 2,2,2-trifluoroethyl, 1,2-difluoroethyl, 3-bromo-2-fluoropropyl, 1,2-dibromoethyl, and the like.

"Heterocycloalkyl" refers to a stable 3- to 24-membered partially or fully saturated ring radical comprising 2 to 23 carbon atoms and from one to 8 heteroatoms selected from the group consisting of nitrogen, oxygen, phosphorous, and sulfur. Unless stated otherwise specifically in the specification, the heterocycloalkyl radical may be a monocyclic, bicyclic, tricyclic or tetracyclic ring system, which may include fused (when fused with an aryl or a heteroaryl ring, the heterocycloalkyl is bonded through a non-aromatic ring atom) or bridged ring systems; and the nitrogen, carbon or sulfur atoms in the heterocycloalkyl radical may be optionally oxidized; the nitrogen atom may be optionally quaternized. In some embodiments, the heterocycloalkyl is a 3- to 6-membered heterocycloalkyl. In some embodiments, the heterocycloalkyl is a 5- to 6-membered heterocycloalkyl. Examples of such heterocycloalkyl radicals include, but are not limited to, aziridinyl, azetidinyl, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, 1,1-dioxo-thiomorpholinyl, 1,3-dihydroisobenzofuran-1-yl, 3-oxo-1,3-dihydroisobenzofuran-1-yl, methyl-2-oxo-1,3-dioxol-4-yl, and 2-oxo-1,3-dioxol-4-yl. The term heterocycloalkyl also includes all ring forms of the carbohydrates, including but not limited to the monosaccharides, the disaccharides and the oligosaccharides. Unless otherwise noted, heterocycloalkyls have from 2 to 10 carbons in the ring. It is understood that when referring to the number of carbon atoms in a heterocycloalkyl, the number of carbon atoms in the heterocycloalkyl is not the same as the total number of atoms (including the heteroatoms) that make up the heterocycloalkyl (i.e. skeletal atoms of the heterocycloalkyl ring). Unless stated otherwise specifically in the specification, a heterocycloalkyl is optionally substituted as described below, for example, with oxo, halogen, amino, nitrile, nitro, hydroxyl, alkyl, haloalkyl, alkoxy, aryl, cycloalkyl, heterocycloalkyl, heteroaryl, and the like. In some embodiments, a heterocycloalkyl is optionally substituted with oxo, halogen, methyl, ethyl, —CN, —$CF_3$, —OH, —OMe, —$NH_2$, or —$NO_2$. In some embodiments, a heterocycloalkyl is optionally substituted with oxo, halogen, methyl, ethyl, —CN, —$CF_3$, —OH, or —OMe.

"Heteroaryl" refers to a 5- to 14-membered ring system radical comprising hydrogen atoms, one to thirteen carbon atoms, one to six heteroatoms selected from the group consisting of nitrogen, oxygen, phosphorous and sulfur, and at least one aromatic ring. The heteroaryl radical may be a monocyclic, bicyclic, tricyclic or tetracyclic ring system, which may include fused (when fused with a cycloalkyl or heterocycloalkyl ring, the heteroaryl is bonded through an aromatic ring atom) or bridged ring systems; and the nitrogen, carbon or sulfur atoms in the heteroaryl radical may be optionally oxidized; the nitrogen atom may be optionally quaternized. In some embodiments, the heteroaryl is a 5- to 10-membered heteroaryl. In some embodiments, the heteroaryl is a 5- to 6-membered heteroaryl. Examples include, but are not limited to, azepinyl, acridinyl, benzimidazolyl, benzothiazolyl, benzindolyl, benzodioxolyl, benzofuranyl, benzooxazolyl, benzothiazolyl, benzothiadiazolyl, benzo[b][1,4]dioxepinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzotriazolyl, benzo[4,6]imidazo[1,2-a]pyridinyl, carbazolyl, cinnolinyl, dibenzofuranyl, dibenzothiophenyl, furanyl, furanonyl, isothiazolyl, imidazolyl, indazolyl, indolyl, indazolyl, isoindolyl, indolinyl, isoindolinyl, isoquinolyl, indolizinyl, isoxazolyl, naphthyridinyl, oxadiazolyl, 2-oxoazepinyl, oxazolyl, oxiranyl, 1-oxidopyridinyl, 1-oxidopyrimidinyl, 1-oxidopyrazinyl, 1-oxidopyridazinyl, 1-phenyl-1H-pyrrolyl, phenazinyl, phenothiazinyl, phenoxazinyl, phthalazinyl, pteridinyl, purinyl, pyrrolyl, pyrazolyl, pyridinyl, pyrazinyl, pyrimidinyl, pyridazinyl, quinazolinyl, quinoxalinyl, quinolinyl, quinuclidinyl, isoquinolinyl, tetrahydroquinolinyl, thiazolyl, thiadiazolyl, triazolyl, tetrazolyl, triazinyl, and thiophenyl (i.e., thienyl). Unless stated otherwise specifically in the specification, a heteroaryl is optionally substituted as described below, for example, with halogen, amino, nitrile, nitro, hydroxyl, alkyl, haloalkyl, alkoxy, aryl, cycloalkyl, heterocycloalkyl, heteroaryl, and the like. In some embodiments, a heteroaryl is optionally substituted with halogen, methyl, ethyl, —CN, —$CF_3$, —OH, —OMe, —$NH_2$, or —$NO_2$. In some embodiments, a heteroaryl is optionally substituted with halogen, methyl, ethyl, —CN, —$CF_3$, —OH, or —OMe.

Process for Preparation of Organo-Boron Compounds

In some embodiments, the starting materials and reagents used for the synthesis of the compounds described herein are synthesized or are obtained from commercial sources, such as, but not limited to, Sigma-Aldrich, Fisher Scientific (Fisher Chemical), and AcrosOrganics.

In further embodiments, the compounds described herein, and other related compounds having different substituents are synthesized using techniques and materials described herein as well as those that are recognized in the field, such as described, for example, in Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), Larock's Comprehensive Organic Transformations (VCH Publishers Inc., 1989), March, Advanced Organic Chemistry 4th Ed., (Wiley 1992); Carey and Sundberg, Advanced Organic Chemistry 4th Ed., Vols. A and B (Plenum 2000, 2001), and Green and Wuts, Protective Groups in Organic Synthesis 3rd Ed., (Wiley 1999) (all of which are incorporated by reference for such disclosure).

Compounds described in WO/2014/089365, WO/2014/110442, WO/2014/151958, and WO/2015/191907 have been shown to be effective beta-lactamase inhibitors. The continued pharmaceutical development of these compounds requires ready access to large quantities of pure material. A common synthetic intermediate for many of these beta-lactamase inhibitors is a compound of Formula (IV):

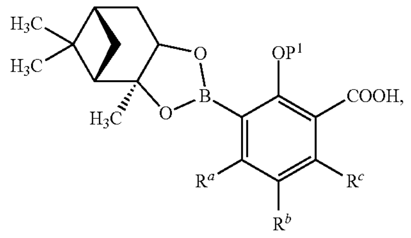

wherein $P^1$ is a hydroxyl protecting group; and $R^a$, $R^b$, and $R^c$ are independently hydrogen, fluoro, or chloro. In some embodiments, the compound of Formula (IV) is compound 4:

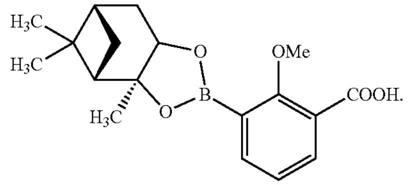 [SMILES: COc1c(B2OC3C[C@@H]4C[C@@H](C4(C)C)[C@]3(C)O2)cccc1C(=O)O]

Compound 4 was previously prepared using the synthetic route depicted in Scheme 1. The starting material 3-iodo-2-methoxy benzoic acid is converted to compound 4 by using bis-((+)-pinanediolato)-diboron and a palladium catalyst.

Scheme 1

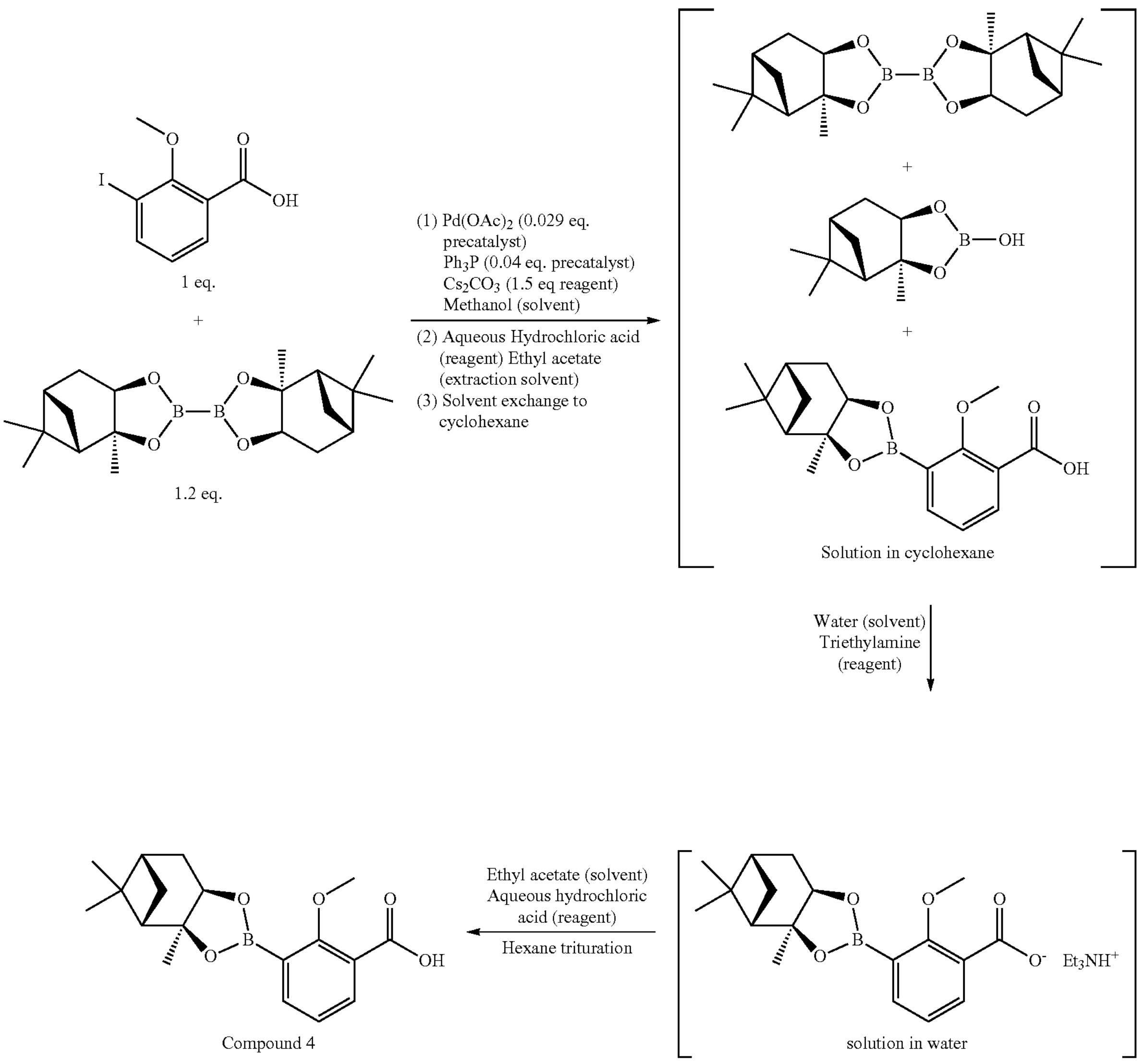

There is a need for a better synthetic route to compound 4. Few suppliers provide the raw material 3-iodo-2-methoxy-benzoic at scale and 3-iodo-2-methoxy-benzoic is typically prepared using environmentally unfriendly chemistry involving electrophilic aromatic halogenation and nitration. Moreover, these synthetic routes involve the use of potentially genotoxic reagents and intermediates such as sodium nitrite, nitro aromatics, and anilines and may also generate N-nitroso-aromatic impurities. The use of such chemicals requires the implementation of dedicated analytical methods and controls to meet strict safety limits. Additionally, the bis-boron reagent is expensive, commercially available only from a limited number of manufacturers, and only half of the reagent is incorporated into the product.

Improved Process

Disclosed herein is an improved process for the manufacture of compounds of Formula (IV) as can be seen below in scheme 2. In some embodiments, the improved process has less steps than the previously described processes.

Scheme 2

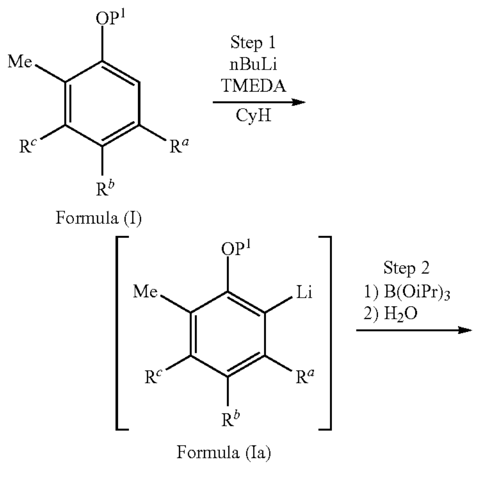

-continued

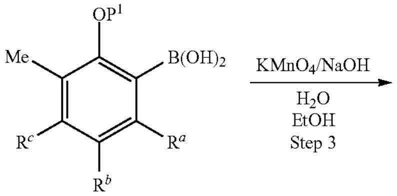

Formula (II)

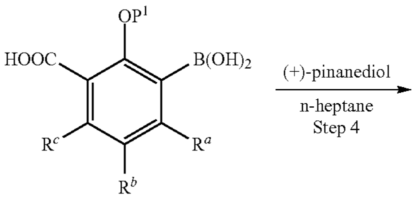

Formula (III)

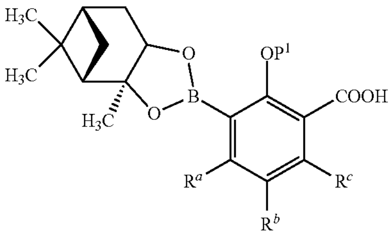

Formula (IV)

Disclosed herein is a process for preparing a compound of Formula (IV):

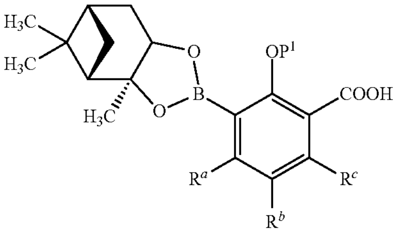

from a compound of Formula (I):

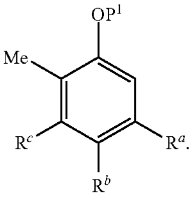

Disclosed herein is an improved process for the manufacture of compound 4, as can be seen below in scheme 3.

Scheme 3

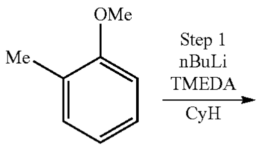

1

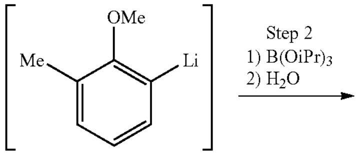

1a

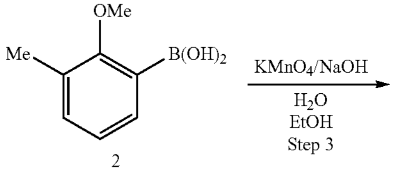

2

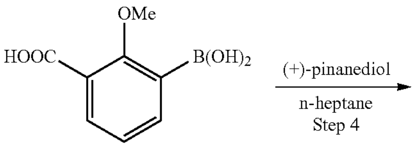

3

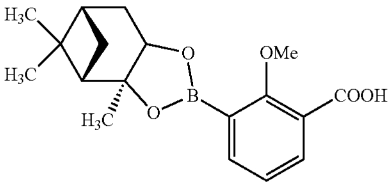

4

Disclosed herein is a process for preparing compound 4:

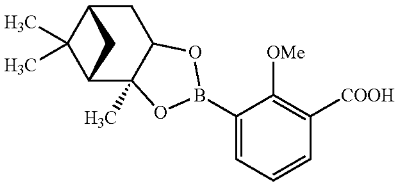 [SMILES: COc1c(B2OC3C[C@@H]4C[C@@H](C4(C)C)[C@]3(C)O2)cccc1C(=O)O]

from compound 1:

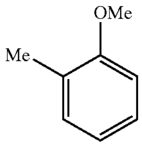

which is readily commercially available.

Disclosed herein is a process for preparing a compound of Formula (II):

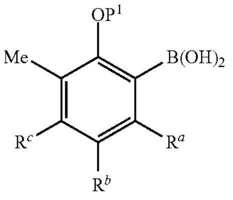

by reacting a compound of Formula (I):

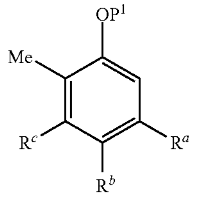

with a lithium reagent followed by a borate.

In some embodiments of a process for preparing a compound of Formula (II), the compound of Formula (I) is contacted with the lithium reagent to form a compound of Formula (Ia):

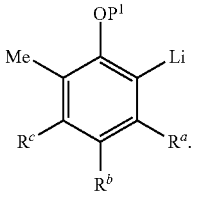

In some embodiments of a process for preparing a compound of Formula (II), the compound of Formula (Ia) is not isolated.

In some embodiments of a process for preparing a compound of Formula (II), the compound of Formula (Ia) is further reacted with the borate to form the compound of Formula (II).

In some embodiments of a process for preparing a compound of Formula (II), the lithium reagent is n-BuLi. In some embodiments of a process for preparing a compound of Formula (II), the lithium reagent is n-hexyl lithium.

In some embodiments of a process for preparing a compound of Formula (II), the borate is $B(OiPr)_3$.

In some embodiments of a process for preparing a compound of Formula (II), the process comprises:

(i) combining a compound of Formula (I):

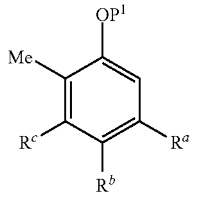

and a diamine in a solvent;

(ii) stirring;

(iii) adding a lithium reagent;

(iv) stirring;

(v) adding a borate;

(vi) quenching the reaction by adding an aqueous acidic solution;

(vii) separating the layers to obtain an organic layer;

(viii) adding an aqueous basic solution to the organic layer;

(ix) separating the layers to obtain an aqueous layer;

(x) adding an acid to the aqueous layer;

(xi) cooling to obtain a suspension;

(xii) stirring;

(xiii) filtering the suspension, thereby obtaining the compound of Formula (II):

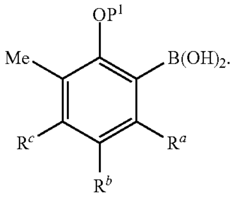

In some embodiments of a process for preparing a compound of Formula (II), the diamine is TMEDA.

In some embodiments of a process for preparing a compound of Formula (II), the solvent use in step (i) is cyclohexane.

In some embodiments of a process for preparing a compound of Formula (II), the lithium reagent is nBuLi. In some embodiments of a process for preparing a compound of Formula (II), the lithium reagent is n-hexyl lithium.

In some embodiments of a process for preparing a compound of Formula (II), the borate is $B(OiPr)_3$.

In some embodiments of a process for preparing a compound of Formula (II), the addition of the lithium reagent in step (iii) is done over about 1 h to about 10 h. In some embodiments of a process for preparing a compound of Formula (II), the addition of the lithium reagent in step (iii) is done over about 3 h to about 10 h. In some embodiments of a process for preparing a compound of Formula (II), the addition of the lithium reagent in step (iii) is done over about 5 h to about 10 h. In some embodiments of a process for preparing a compound of Formula (II), the addition of the lithium reagent in step (iii) is done over about 1 h to about 9 h. In some embodiments of a process for preparing a compound of Formula (II), the addition of the lithium reagent in step (iii) is done over about 3 h to about 9 h. In some embodiments of a process for preparing a compound of Formula (II), the addition of the lithium reagent in step (iii) is done over about 5 h to about 9 h. In some embodiments of a process for preparing a compound of Formula (II), the addition of the lithium reagent in step (iii) is done over about 1 h to about 8 h. In some embodiments of a process for preparing a compound of Formula (II), the addition of the lithium reagent in step (iii) is done over about 3 h to about 8 h. In some embodiments of a process for preparing a compound of Formula (II), the addition of the lithium reagent in step (iii) is done over about 5 h to about 8 h. In some embodiments of a process for preparing a compound of Formula (II), the addition of the lithium reagent in step (iii) is done over about 1 h to about 7 h. In some embodiments of a process for preparing a compound of Formula (II), the addition of the lithium reagent in step (iii) is done over about 3 h to about 7 h. In some embodiments of a process for preparing a compound of Formula (II), the addition of the lithium reagent in step (iii) is done over about 5 h to about 7 h. In some embodiments of a process for preparing a compound of Formula (II), the addition of the lithium reagent in step (iii) is done over about 1 h to about 6 h. In some embodiments of a process for preparing a compound of Formula (II), the addition of the lithium reagent in step (iii) is done over about 3 h to about 6 h. In some embodiments of a process for preparing a compound of Formula (II), the addition of the lithium reagent in step (iii) is done over about 1 h to about 5 h. In some embodiments of a process for preparing a compound of Formula (II), the addition of the lithium reagent in step (iii) is done over about 3 h to about 5 h. In some embodiments of a process for preparing a compound of Formula (II), the addition of the lithium reagent in step (iii) is done over about 1 h to about 4 h. In some embodiments of a process for preparing a compound of Formula (II), the addition of the lithium reagent in step (iii) is done over about 1 h to about 3 h. In some embodiments of a process for preparing a compound of Formula (II), step (iv) is performed for about 2 h to about 3 h.

In some embodiments of a process for preparing a compound of Formula (II), the addition of the lithium reagent in step (iii) is done while the temperature is maintained between about 0° C. and about 20° C. In some embodiments of a process for preparing a compound of Formula (II), the addition of the lithium reagent in step (iii) is done while the temperature is maintained between about 0° C. and about 30° C. In some embodiments of a process for preparing a compound of Formula (II), the addition of the lithium reagent in step (iii) is done while the temperature is maintained between about 10° C. and about 20° C. In some embodiments of a process for preparing a compound of Formula (II), the addition of the lithium reagent in step (iii) is done while the temperature is maintained between about 10° C. and about 30° C.

In some embodiments of a process for preparing a compound of Formula (II), the temperature is cooled to below −70° C. prior to the addition of the borate in step (v). In some embodiments of a process for preparing a compound of Formula (II), the temperature is cooled to −75° C. prior to the addition of the borate in step (v).

In some embodiments of a process for preparing a compound of Formula (II), the temperature is warmed to above −20° C. after to the addition of the borate in step (v). In some embodiments of a process for preparing a compound of Formula (II), the temperature is warmed to −20° C. after to the addition of the borate in step (v).

In some embodiments of a process for preparing a compound of Formula (II), the aqueous acidic solution in step (vi) is a HCl solution.

In some embodiments of a process for preparing a compound of Formula (II), the aqueous basic solution in step (viii) is a NaOH solution.

In some embodiments of a process for preparing a compound of Formula (II), the cooling temperature in step (xi) is about 0° C. and about 5° C. In some embodiments of a process for preparing a compound of Formula (II), the cooling temperature in step (xi) is about 0° C. and about 10° C. In some embodiments of a process for preparing a compound of Formula (II), the cooling temperature in step (xi) is about 5° C. and about 10° C.

In some embodiments of a process for preparing a compound of Formula (II), the aqueous acidic solution in step (x) is a HCl solution.

In some embodiments of a process for preparing a compound of Formula (II), the compound of Formula (II):

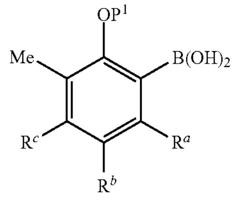

is obtained by filtration. In some embodiments of a process for preparing a compound of Formula (II), the filtration cake obtained is washed with water.

In some embodiments of a process for preparing a compound of Formula (II), $P^1$ is $C_1$-$C_6$ alkyl. In some embodiments of a process for preparing a compound of Formula (II), $P^1$ is methyl.

In some embodiments of a process for preparing a compound of Formula (II), $R^a$, $R^b$, and $R^c$ are independently hydrogen or fluoro. In some embodiments of a process for preparing a compound of Formula (II), $R^a$ is halogen. In some embodiments of a process for preparing a compound of Formula (II), $R^b$ is halogen. In some embodiments of a process for preparing a compound of Formula (II), $R^c$ is halogen. In some embodiments of a process for preparing a compound of Formula (II), $R^a$, $R^b$, and $R^c$ are hydrogen.

Described herein is process for preparing a compound of Formula (III):

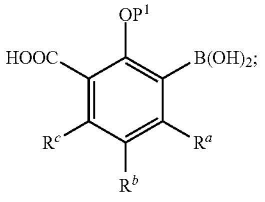

wherein:

$P^1$ is a hydroxyl protecting group; and $R^a$, $R^b$, and $R^c$ are independently hydrogen, fluoro, or chloro;

the process comprising reacting a compound of Formula (II):

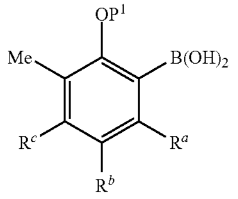

with an oxidizing agent.

In some embodiments of a process for preparing a compound of Formula (III), the oxidizing agent is potassium permanganate ($KMnO_4$). In some embodiments of a process for preparing a compound of Formula (III), the oxidizing agent is a chromium reagent. In some embodiments of a process for preparing a compound of Formula (III), the oxidizing agent is a copper reagent.

In some embodiments of a process for preparing a compound of Formula (III), the process further comprises a base.

In some embodiments of a process for preparing a compound of Formula (III), the process comprises:

(i) suspending the compound of Formula (II):

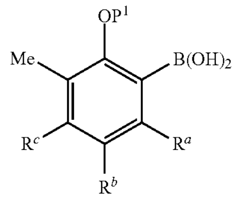

in water;

(ii) adding a base to dissolve the compound of Formula (II) in water;

(iii) adding an oxidizing agent while stirring;

(iv) stirring;

(iv) adding a solvent to inactivate the excess oxidizing agent;

(v) stirring;

(vi) filtering to get a filtrate;

(vii) acidifying the filtrate to get a slurry;

(viii) cooling the slurry; and (ix) filtering the slurry thereby obtaining the compound of Formula (III):

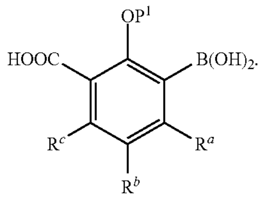

In some embodiments of a process for preparing a compound of Formula (III), the base in step (ii) is sodium hydroxide.

In some embodiments of a process for preparing a compound of Formula (III), the oxidizing agent is potassium permanganate ($KMnO_4$). In some embodiments of a process for preparing a compound of Formula (III), the oxidizing agent is a chromium reagent.

In some embodiments of a process for preparing a compound of Formula (III), step (iii) is performed for about 10 h to about 20 h. In some embodiments of a process for preparing a compound of Formula (III), step (iii) is performed for about 15 h to about 20 h. In some embodiments of a process for preparing a compound of Formula (III), step (iii) is performed for about 10 h to about 15 h. In some embodiments of a process for preparing a compound of Formula (III), step (iii) is performed for about 15 h to about 18 h. In some embodiments of a process for preparing a compound of Formula (III), step (iii) is performed for about 10 h. In some embodiments of a process for preparing a compound of Formula (III), step (iii) is performed for about 11 h. In some embodiments of a process for preparing a compound of Formula (III), step (iii) is performed for about 12 h. In some embodiments of a process for preparing a compound of Formula (III), step (iii) is performed for about 13 h. In some embodiments of a process for preparing a compound of Formula (III), step (iii) is performed for about 14 h. In some embodiments of a process for preparing a compound of Formula (III), step (iii) is performed for about 15 h. In some embodiments of a process for preparing a compound of Formula (III), step (iii) is performed for about 16 h. In some embodiments of a process for preparing a compound of Formula (III), step (iii) is performed for about 17 h. In some embodiments of a process for preparing a compound of Formula (III), step (iii) is performed for about 18 h. In some embodiments of a process for preparing a compound of Formula (III), step (iii) is performed for about 19 h. In some embodiments of a process for preparing a compound of Formula (III), step (iii) is performed for about 20 h.

In some embodiments of a process for preparing a compound of Formula (III), the oxidizing agent is added in portions. In some embodiments of a process for preparing a compound of Formula (III), the oxidizing agent is added in portions to maintain the temperature at between about 20° C. and about 30° C.

In some embodiments of a process for preparing a compound of Formula (III), the temperature is maintained at between about 20° C. and about 30° C. in step (iii). In some embodiments of a process for preparing a compound of Formula (III), the temperature is maintained at less or equal to 35° C. in step (iii).

In some embodiments of a process for preparing a compound of Formula (iv), step (iv) is performed for about 1 h to about 20 h. In some embodiments of a process for preparing a compound of Formula (iv), step (iv) is performed for about 1 h to about 10 h. In some embodiments of a process for preparing a compound of Formula (iv), step (iv) is performed for about 1 h to about 5 h. In some embodiments of a process for preparing a compound of Formula (iv), step (iv) is performed for about 5 h to about 10 h. In some embodiments of a process for preparing a compound of Formula (iv), step (iv) is performed for about 5 h to about 8 h.

In some embodiments of a process for preparing a compound of Formula (III), the solvent to inactivate the excess oxidizing agent is a primary or secondary alcoholic solvent. In some embodiments of a process for preparing a compound of Formula (III), the solvent to inactivate the excess oxidizing agent is ethanol.

In some embodiments of a process for preparing a compound of Formula (III), step (vi) is performed for about 10 min to about 2 h. In some embodiments of a process for preparing a compound of Formula (III), step (vi) is performed for about 30 min. In some embodiments of a process for preparing a compound of Formula (III), step (vi) is performed for about 1 h. In some embodiments of a process for preparing a compound of Formula (III), step (vi) is performed for about 2 h.

The process for preparing a compound of Formula (III), the filtrate obtained in step (vii) is cooled to between about 0° C. and about 10° C. in step (viii) prior to acidifying.

In some embodiments of a process for preparing a compound of Formula (III), the filtrate is cooled to about 5° C. in step (viii) prior to acidifying.

In some embodiments of a process for preparing a compound of Formula (III), the acid used for acidifying is sulfuric acid.

In some embodiments of a process for preparing a compound of Formula (III), the compound of Formula (III) is obtained by filtration.

In some embodiments of a process for preparing a compound of Formula (III), $P^1$ is $C_1$-$C_6$ alkyl. In some embodiments of a process for preparing a compound of Formula (III), $P^1$ is methyl.

In some embodiments of a process for preparing a compound of Formula (III), $R^a$, $R^b$, and $R^c$ are independently hydrogen or fluoro. In some embodiments of a process for preparing a compound of Formula (III), $R^a$ is halogen. In some embodiments of a process for preparing a compound of Formula (III), $R^b$ is halogen. In some embodiments of a process for preparing a compound of Formula (III), $R^c$ is halogen. In some embodiments of a process for preparing a compound of Formula (III), $R^a$, $R^b$, and $R^c$ are hydrogen.

Described herein is process for preparing a compound of Formula (IV):

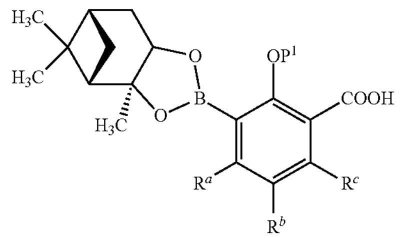

from a compound of Formula (III):

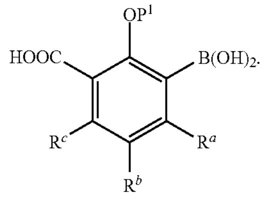

In some embodiments of a process for preparing a compound of Formula (IV), the compound of Formula (III):

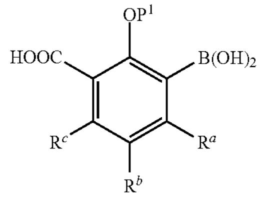

is reacted with (1S,2S,3R,5S)-(+)-pinanediol in a solvent to form a compound of Formula (IV):

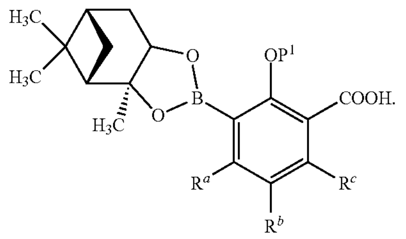

In some embodiments of a process for preparing a compound of Formula (IV), the solvent is n-heptane.

In some embodiments of a process for preparing a compound of Formula (IV), the process comprises:

(i) mixing the compound of Formula (III), (1S,2S,3R,5S)-(+)-pinanediol, and the solvent;

(ii) heating the resulting mixture;

(iii) cooling to obtain a slurry;

(iv) filtering to obtain the compound of Formula (IV).

In some embodiments of a process for preparing a compound of Formula (IV), the solvent is n-heptane.

In some embodiments of a process for preparing a compound of Formula (IV), the heating is done to reach reflux.

In some embodiments of a process for preparing a compound of Formula (IV), step (ii) further comprises removing water.

In some embodiments of a process for preparing a compound of Formula (IV), the cooling temperature in step (iii) is below about 60° C.

In some embodiments of a process for preparing a compound of Formula (IV), $P^1$ is $C_1$-$C_6$ alkyl. In some embodiments of a process for preparing a compound of Formula (IV), $P^1$ is methyl.

In some embodiments of a process for preparing a compound of Formula (IV), $R^a$, $R^b$, and $R^c$ are independently hydrogen or fluoro. In some embodiments of a process for preparing a compound of Formula (IV), $R^a$ is halogen. In some embodiments of a process for preparing a compound of Formula (IV), $R^b$ is halogen. In some embodiments of a process for preparing a compound of Formula (IV), $R^c$ is halogen. In some embodiments of a process for preparing a compound of Formula (IV), $R^a$, $R^b$, and $R^c$ are hydrogen.

Disclosed herein is a process for the manufacture of a compound of Formula (A) as outlined in Scheme 4:

Scheme 4

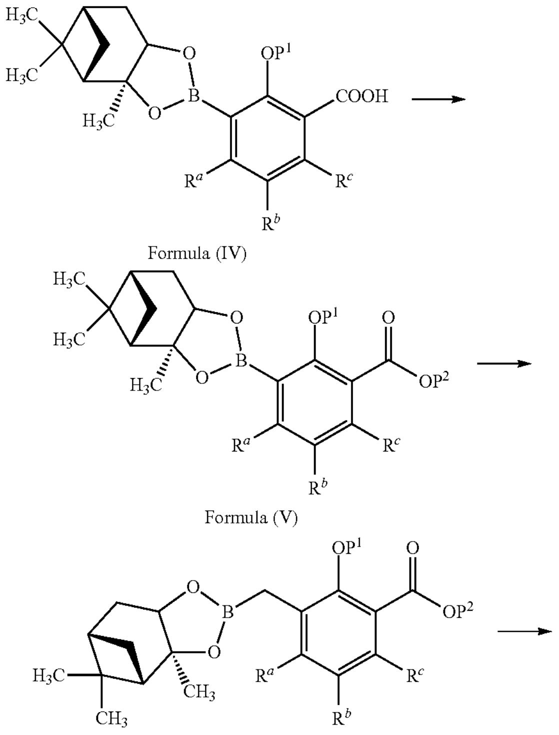

Formula (IV)

Formula (V)

Formula (VI)

-continued

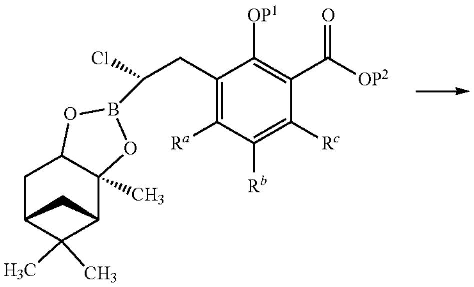

Formula (VII)

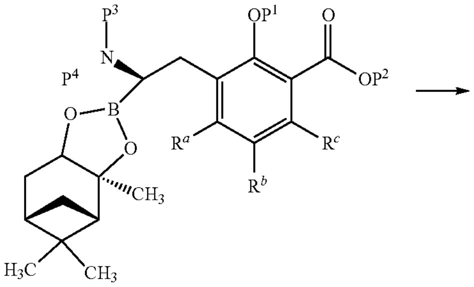

Formula (VIII)

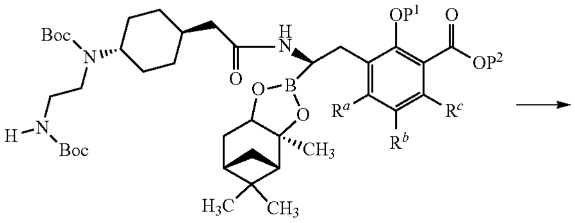

Formula (IX)

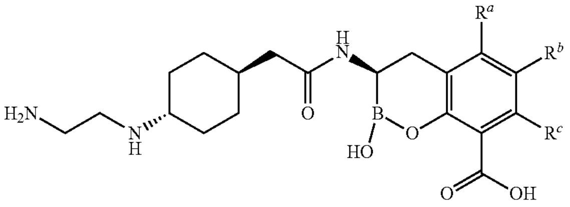

Formula (A)

Disclosed herein is a process for preparing a compound of Formula (A):

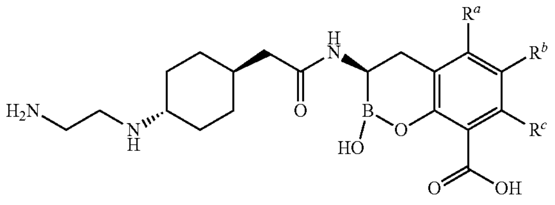

using a compound of Formula (III):

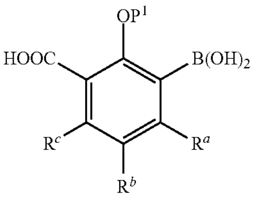

made from a process disclosed herein;

wherein:

$P^1$ is a hydroxyl protecting group; and $R^a$, $R^b$, and $R^c$ are independently hydrogen, fluoro, or chloro.

In some embodiments of a process for preparing a compound of Formula (A), the compound of Formula (III):

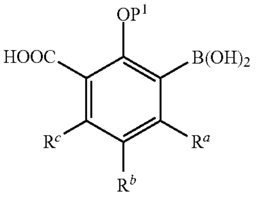

is reacted with (1S,2S,3R,5S)-(+)-pinanediol to form a compound of Formula (IV):

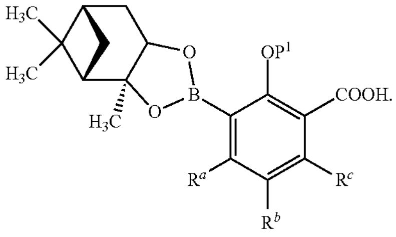

Disclosed herein is a process for preparing a compound of Formula (A):

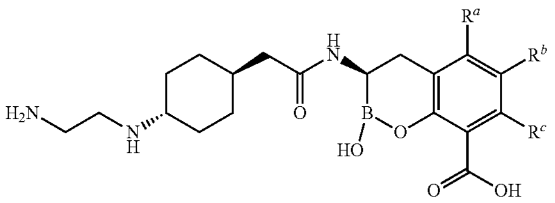

using a compound of Formula (IV):

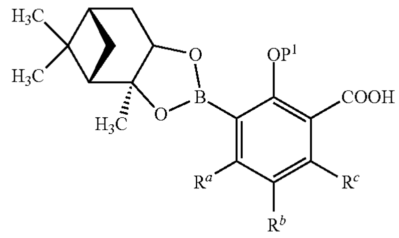

made from a process disclosed herein;

wherein:

$P^1$ is a hydroxyl protecting group; and $R^a$, $R^b$, and $R^c$ are independently hydrogen, fluoro, or chloro.

In some embodiments of a process for preparing a compound of Formula (A), the compound of Formula (IV):

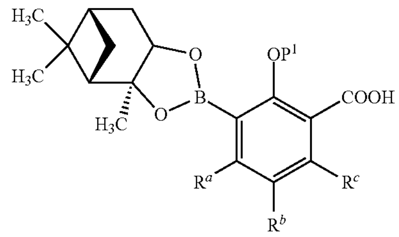

is reacted with a carboxyl protecting group to form a compound of Formula (V):

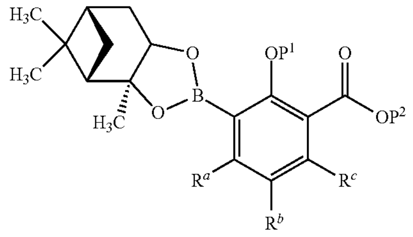

wherein $P^2$ is a carboxyl protecting group.

In some embodiments of a process for preparing a compound of Formula (A), the carboxyl protecting reagent is $SOCl_2$ followed by NaOtBu.

In some embodiments of a process for preparing a compound of Formula (A), the compound of Formula (V):

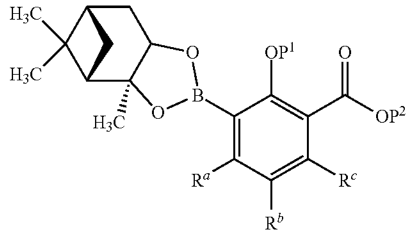

is reacted with chloroiodomethane and a hindered Grignard reagent to form a compound of Formula (VI):

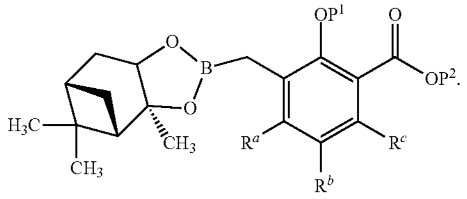

In some embodiments of a process for preparing a compound of Formula (A), the hindered Grignard reagent is isopropylmagnesium chloride, cyclohexylmagnesium chloride, or isopropylmagnesium chloride:lithium chloride. In some embodiments of a process for preparing a compound of Formula (A), the hindered Grignard reagent is isopropylmagnesium chloride:lithium chloride.

In some embodiments of a process for preparing a compound of Formula (A), the compound of Formula (VI):

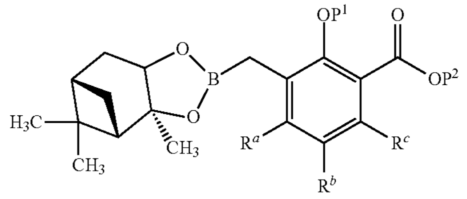

is reacted with dichloromethane and a base followed by a Lewis acid to for a compound of Formula (VII):

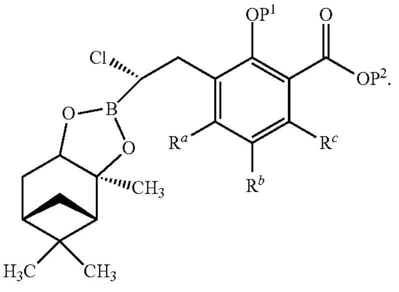

In some embodiments of a process for preparing a compound of Formula (A), the base is lithium diisopropylamide or 2,2,6,6-tetramethylpiperidinylmagnesium chloride: lithium chloride. In some embodiments of a process for preparing a compound of Formula (A), the base is lithium diisopropylamide.

In some embodiments of a process for preparing a compound of Formula (A), the Lewis acid is $ZnCl_2$.

In some embodiments of a process for preparing a compound of Formula (A), the compound of Formula (VII):

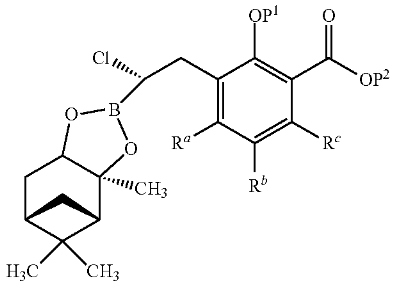

is reacted with a protected ammonium reagent to form a compound of Formula (VIII):

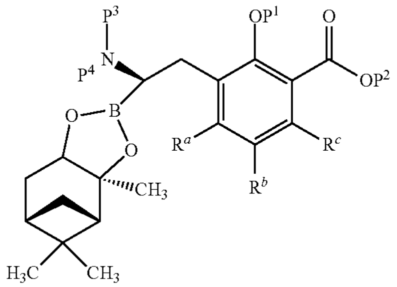

wherein $P^3$ and $P^4$ are amine protecting groups.

In some embodiments of a process for preparing a compound of Formula (A), the protected ammonium reagent is a metal salt of hexaalkyldisilazane.

In some embodiments of a process for preparing a compound of Formula (A), the compound of Formula (VIII):

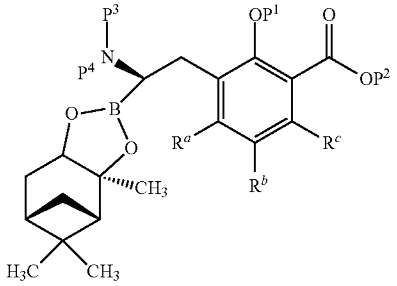

is reacted with

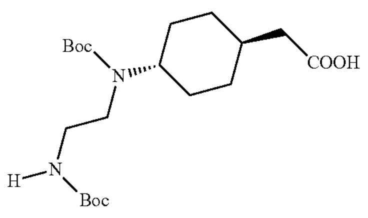 [SMILES: CC(C)(C)OC(=O)NCCN(C(=O)OC(C)(C)C)[C@H]1CC[C@H](CC(=O)O)CC1]

to form a compound of Formula (IX):

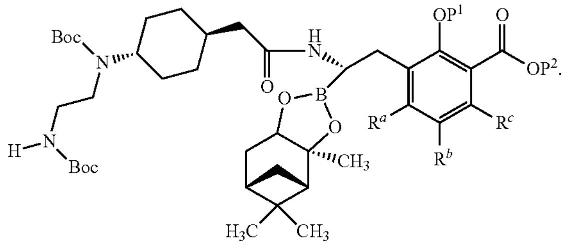

In some embodiments of a process for preparing a compound of Formula (A), the process further comprises a coupling reagent. In some embodiments of a process for preparing a compound of Formula (A), the coupling reagent is HATU, EDC, HBTU, HCTU, HOBt, PyAOP, PyBOP, or TBTU. In some embodiments of a process for preparing a compound of Formula (A), the coupling reagent is HATU.

In some embodiments of a process for preparing a compound of Formula (A), the compound of Formula (IX):

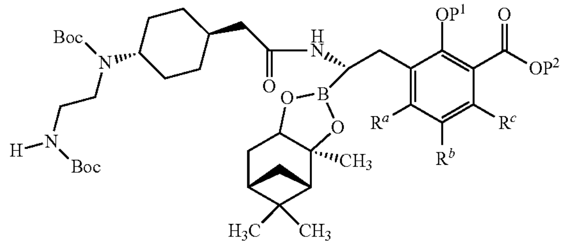

is reacted with an acid to form the compound of Formula (A):

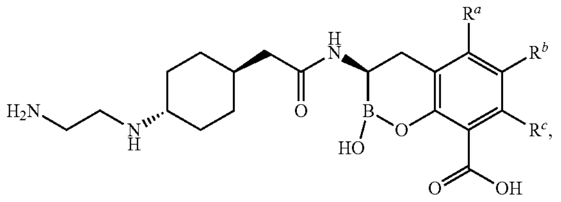

or a pharmaceutically acceptable salt thereof.

In some embodiments of a process for preparing a compound of Formula (A), $P^1$ is $C_1$-$C_6$ alkyl. In some embodiments of a process for preparing a compound of Formula (A), $P^1$ is methyl.

In some embodiments of a process for preparing a compound of Formula (A), $R^a$, $R^b$, and $R^c$ are independently hydrogen or fluoro. In some embodiments of a process for preparing a compound of Formula (A), $R^a$ is halogen. In some embodiments of a process for preparing a compound of Formula (A), $R^b$ is halogen. In some embodiments of a process for preparing a compound of Formula (A), $R^c$ is halogen. In some embodiments of a process for preparing a compound of Formula (A), $R^a$, $R^b$, and $R^c$ are hydrogen.

In some embodiments of a process for preparing a compound of Formula (A), $P^2$ is $C_1$-$C_6$ alkyl. In some embodiments of a process for preparing a compound of Formula (A), $P^2$ is tert-butyl.

In some embodiments of a process for preparing a compound of Formula (A), $P^3$ and $P^4$ are trimethylsilyl.

In some embodiments of a process for preparing a compound of Formula (A), the compound of Formula (A) is

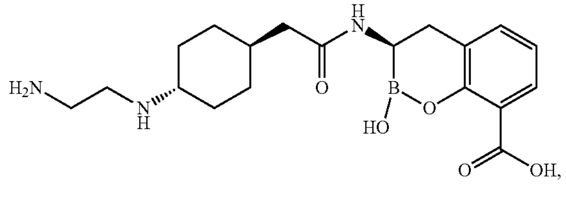 [SMILES: NCCN[C@H]1CC[C@H](CC(=O)N[C@H]2Cc3cccc(C(=O)O)c3OB2O)CC1]

or a pharmaceutically acceptable salt thereof. In some embodiments of a process for preparing a compound of Formula (A), the compound of Formula (A) is

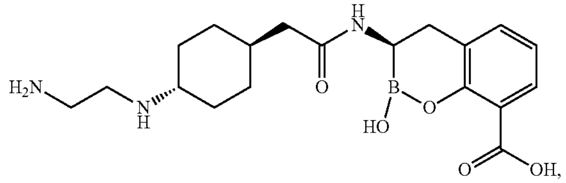 [SMILES: NCCN[C@H]1CC[C@H](CC(=O)N[C@H]2Cc3cccc(C(=O)O)c3OB2O)CC1]

dihydrochloride.

Disclosed herein is a process for the manufacture of a compound of Formula (A) as outlined in Scheme 5:

Scheme 5

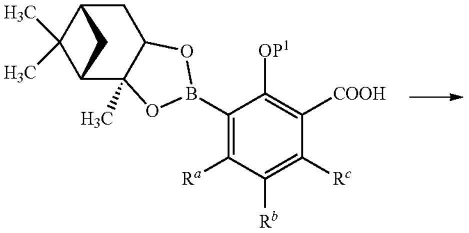

Formula (IV)

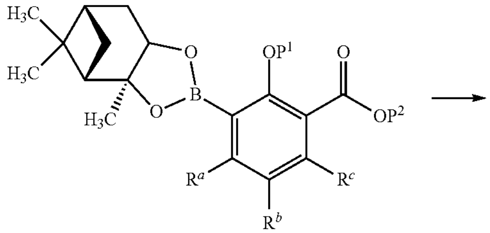

Formula (V)

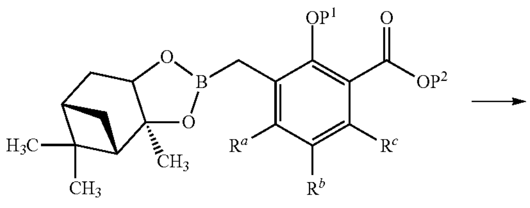

Formula (VI)

-continued

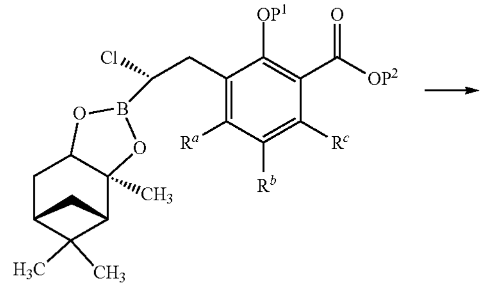

Formula (VII)

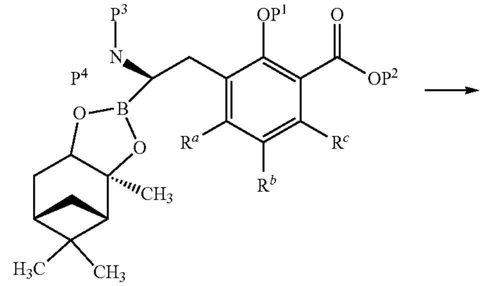

Formula (VIII)

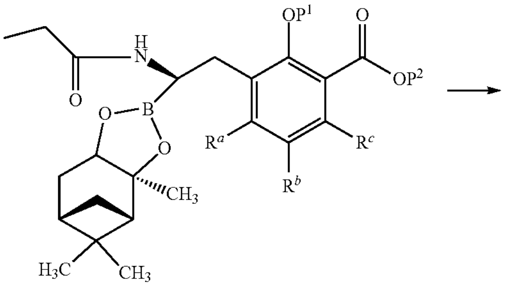

Formula (X)

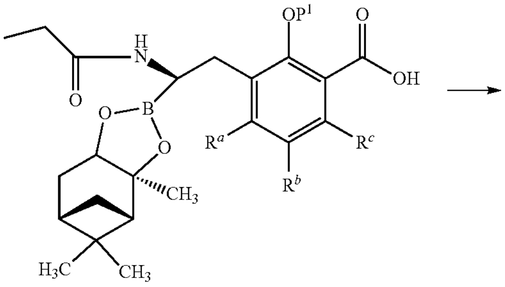

Formula (XI)

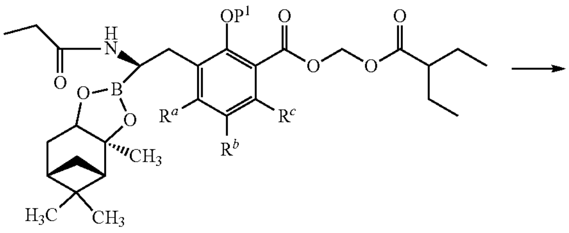

Formula (XII)

-continued

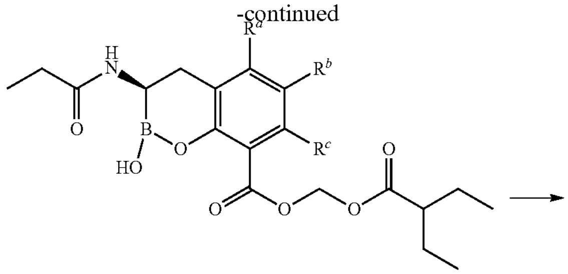

Formula (B)

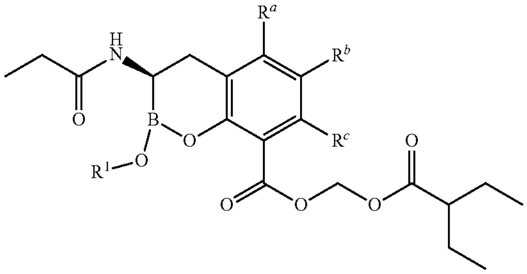

Formula (C)

Disclosed herein is a process for preparing a compound of Formula (B):

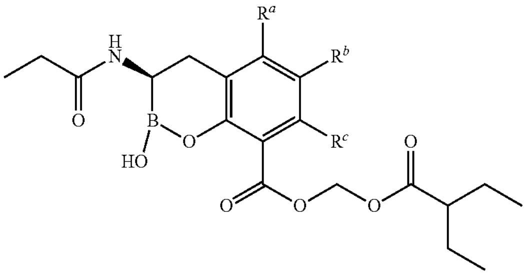

using a compound of Formula (III):

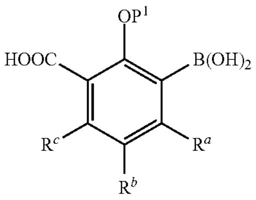

made from a process disclosed herein;

wherein:

$P^1$ is a hydroxyl protecting group; and $R^a$, $R^b$, and $R^c$ are independently hydrogen, fluoro, or chloro.

In some embodiments of a process for preparing a compound of Formula (B), the compound of Formula (III):

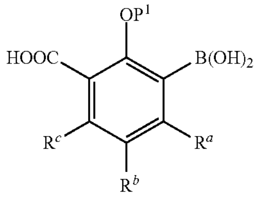

is reacted with (1S,2S,3R,5S)-(+)-pinanediol to form a compound of Formula (IV):

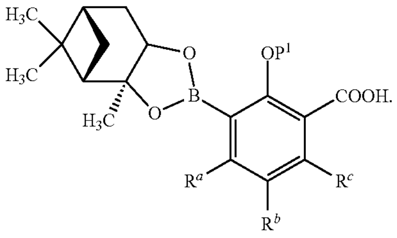

Disclosed herein is a process for preparing a compound of Formula (B):

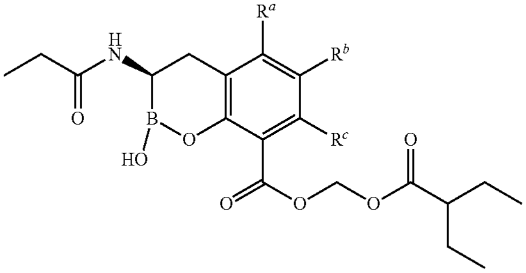

using a compound of Formula (IV):

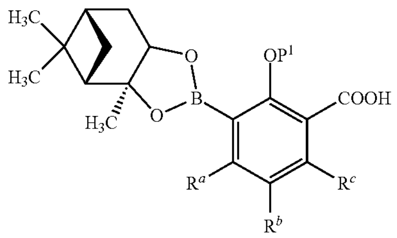

made from a process disclosed herein;

wherein:

$P^1$ is a hydroxyl protecting group; and $R^a$, $R^b$, and $R^c$ are independently hydrogen, fluoro, or chloro.

In some embodiments of a process for preparing a compound of Formula (B), the compound of Formula (IV):

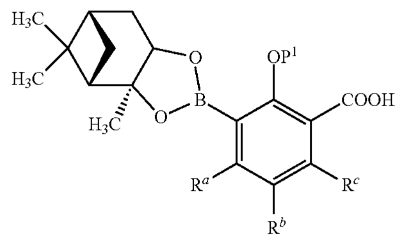

is reacted with a carboxyl protecting reagent to form a compound of Formula (V):

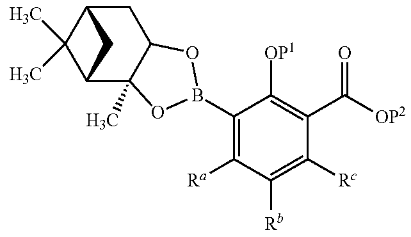

wherein $P^2$ is a carboxyl protecting group.

In some embodiments of a process for preparing a compound of Formula (B), the carboxyl protecting reagent is $SOCl_2$ followed by NaOtBu.

In some embodiments of a process for preparing a compound of Formula (B), the compound of Formula (V):

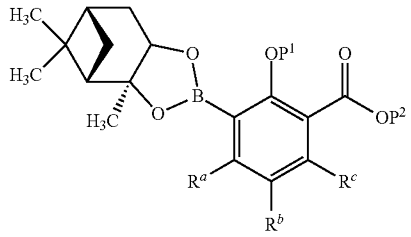

is reacted with chloroiodomethane and a hindered Grignard reagent to form a compound of Formula (VI):

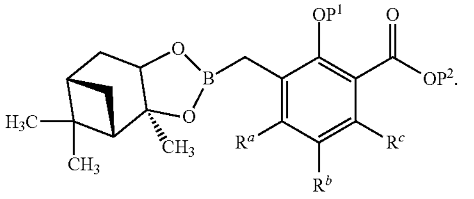

In some embodiments of a process for preparing a compound of Formula (B), the hindered Grignard reagent is isopropylmagnesium chloride, cyclohexylmagnesium chloride, or isopropylmagnesium chloride:lithium chloride.

In some embodiments of a process for preparing a compound of Formula (B), the hindered Grignard reagent is isopropylmagnesium chloride:lithium chloride.

In some embodiments of a process for preparing a compound of Formula (B), the compound of Formula (VI):

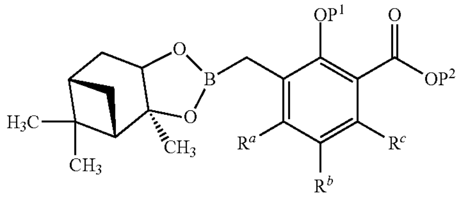

is reacted with dichloromethane and a base followed by a Lewis acid to for a compound of Formula (VII):

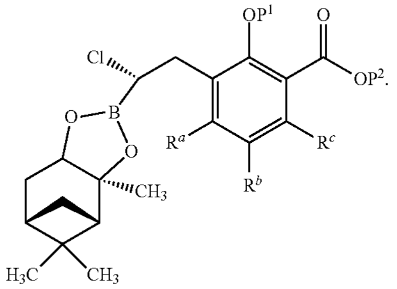

In some embodiments of a process for preparing a compound of Formula (B), the base is lithium diisopropylamide or 2,2,6,6-tetramethylpiperidinylmagnesium chloride: lithium chloride.

In some embodiments of a process for preparing a compound of Formula (B), the base is lithium diisopropylamide.

In some embodiments of a process for preparing a compound of Formula (B), the Lewis acid is $ZnCl_2$.

In some embodiments of a process for preparing a compound of Formula (B), the compound of Formula (VII):

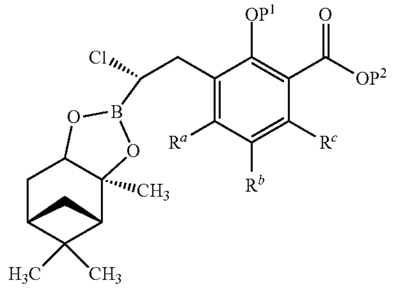

is reacted with a protected ammonium reagent to form a compound of Formula (VIII):

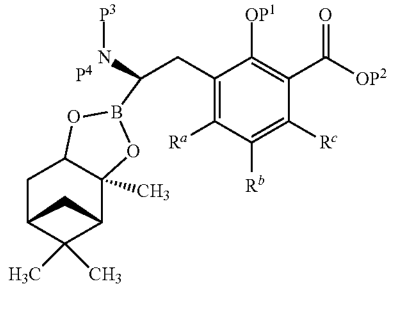

wherein $P^3$ and $P^4$ are amine protecting groups.

In some embodiments of a process for preparing a compound of Formula (B), the protected ammonium reagent is a metal salt of hexaalkyldisilazane.

In some embodiments of a process for preparing a compound of Formula (B), the compound of Formula (VIII):

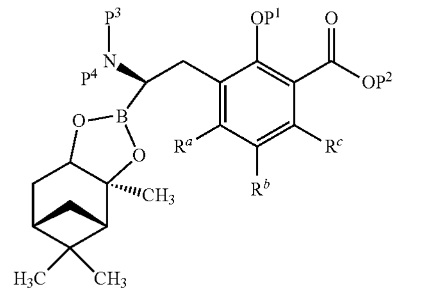

is reacted with EtC(=O)Cl to form a compound of Formula (X):

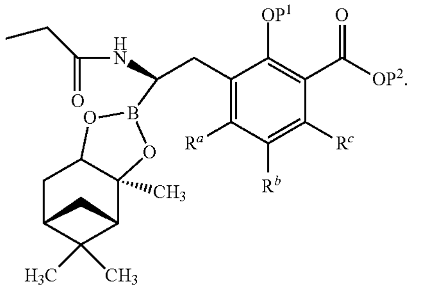

In some embodiments of a process for preparing a compound of Formula (B), the compound of Formula (X):

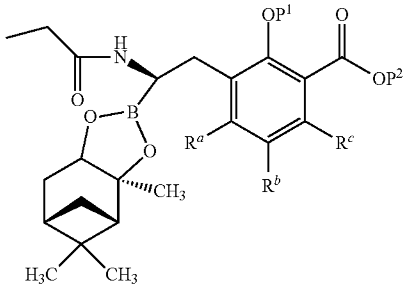

is reacted with a deprotecting agent to form a compound of Formula (XI):

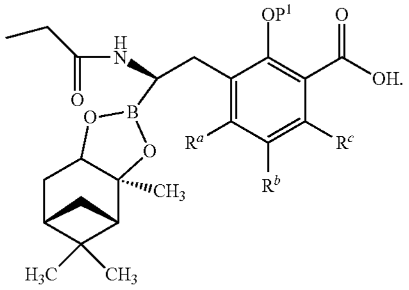

In some embodiments of a process for preparing a compound of Formula (B), the deprotecting agent is methanesulfonic acid.

In some embodiments of a process for preparing a compound of Formula (B), the compound of Formula (XI):

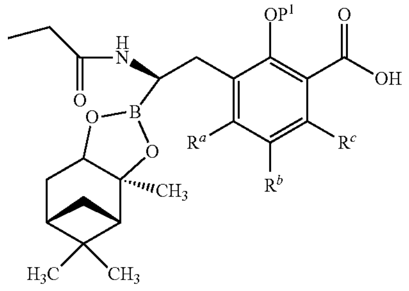

is reacted with

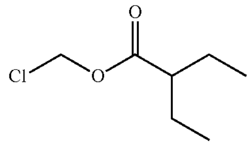

to form a compound of Formula (XII):

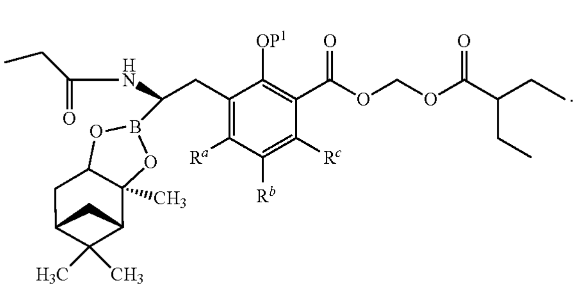

In some embodiments of a process for preparing a compound of Formula (B), the compound of Formula (XII):

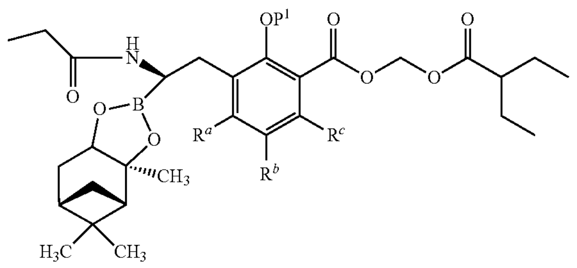

is reacted with propionyl chloride in the presence of an alkali metal or quaternary ammonium salt of bromine or iodine to form a compound of Formula (B):

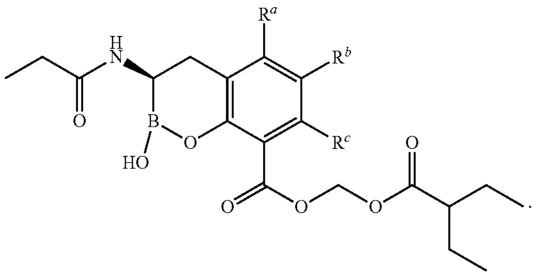

In some embodiments of a process for preparing a compound of Formula (B), the alkali metal salt of bromine is LiBr.

In some embodiments of a process for preparing a compound of Formula (B), $P^1$ is $C_1$-$C_6$ alkyl. In some embodiments of a process for preparing a compound of Formula (B), $P^1$ is methyl.

In some embodiments of a process for preparing a compound of Formula (B), $R^a$, $R^b$, and $R^c$ are independently hydrogen or fluoro. In some embodiments of a process for preparing a compound of Formula (B), $R^a$ is halogen. In some embodiments of a process for preparing a compound of Formula (B), $R^b$ is halogen. In some embodiments of a process for preparing a compound of Formula (B), $R^c$ is halogen. In some embodiments of a process for preparing a compound of Formula (B), $R^a$, $R^b$, and $R^c$ are hydrogen.

In some embodiments of a process for preparing a compound of Formula (B), $P^2$ is $C_1$-$C_6$ alkyl. In some embodiments of a process for preparing a compound of Formula (B), $P^2$ is tert-butyl.

In some embodiments of a process for preparing a compound of Formula (B), $P^3$ and $P^4$ are trimethylsilyl.

In some embodiments of a process for preparing a compound of Formula (B), the compound of Formula (B) is

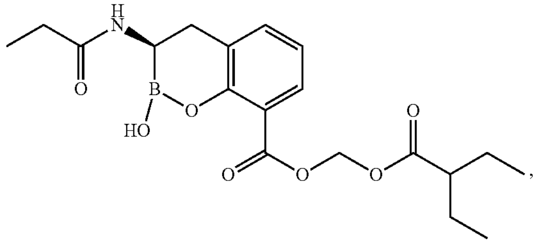 [SMILES: CCC(=O)N[C@H]1Cc2cccc(C(=O)OCOC(=O)C(CC)CC)c2OB1O]

or a pharmaceutically acceptable salt thereof.

Disclosed herein is a process for preparing a compound of Formula (C):

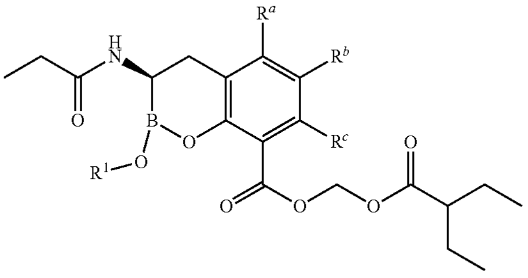

from a compound of Formula (B) made using a process described herein.

In some embodiments of a process for preparing a compound of Formula (C), the compound of Formula (B):

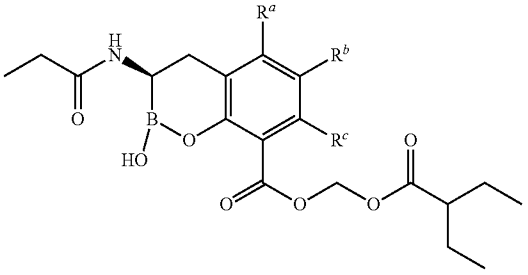

is reacted with $R^1$—OH to form a compound of Formula (C):

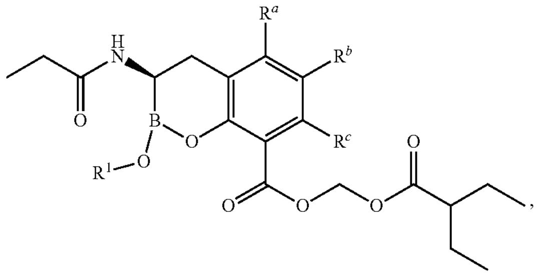

wherein $R^1$ is optionally substituted $C_1$-$C_6$ alkyl, optionally substituted $C_1$-$C_6$ haloalkyl, optionally substituted $C_1$-$C_6$ hydroxyalkyl, optionally substituted $C_1$-$C_6$ aminoalkyl, optionally substituted $C_1$-$C_6$ deuteroalkyl, optionally substituted $C_1$-$C_6$ heteroalkyl, optionally substituted $C_2$-$C_6$ alkenyl, optionally substituted $C_2$-$C_6$ alkynyl, optionally substituted cycloalkyl, optionally substituted heterocycloalkyl, optionally substituted ($C_1$-$C_6$ alkyl)cycloalkyl, optionally substituted ($C_1$-$C_6$ alkyl)heterocycloalkyl, optionally substituted ($C_1$-$C_6$ alkyl)aryl, or optionally substituted ($C_1$-$C_6$ alkyl)heteroaryl.

In some embodiments of a process for preparing a compound of Formula (C), $P^1$ is $C_1$-$C_6$ alkyl. In some embodiments of a process for preparing a compound of Formula (C), $P^1$ is methyl.

In some embodiments of a process for preparing a compound of Formula (C), $R^a$, $R^b$, and $R^c$ are independently hydrogen or fluoro. In some embodiments of a process for preparing a compound of Formula (C), $R^a$ is halogen. In some embodiments of a process for preparing a compound of Formula (C), $R^b$ is halogen. In some embodiments of a process for preparing a compound of Formula (C), $R^c$ is halogen. In some embodiments of a process for preparing a compound of Formula (C), $R^a$, $R^b$, and $R^c$ are hydrogen.

In some embodiments of a process for preparing a compound of Formula (C), $P^2$ is $C_1$-$C_6$ alkyl. In some embodiments of a process for preparing a compound of Formula (C), $P^2$ is tert-butyl.

In some embodiments of a process for preparing a compound of Formula (C), $P^3$ and $P^4$ are trimethylsilyl.

In some embodiments of a process for preparing a compound of Formula (C), $R^1$ is optionally substituted $C_1$-$C_6$ alkyl, optionally substituted $C_1$-$C_6$ haloalkyl, or optionally substituted $C_1$-$C_6$ deuteroalkyl. In some embodiments of a process for preparing a compound of Formula (C), $R^1$ is optionally substituted $C_1$-$C_6$ alkyl. In some embodiments of a process for preparing a compound of Formula (C), $R^1$ is $C_1$-$C_6$ alkyl. In some embodiments of a process for preparing a compound of Formula (C), $R^1$ is ethyl.

In some embodiments of a process for preparing a compound of Formula (C), the compound of Formula (C) is

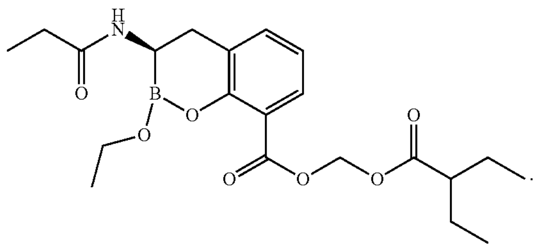 [SMILES: CCOB1Oc2c(cccc2C(=O)OCOC(=O)C(CC)CC)C[C@@H]1NC(=O)CC]

Combination Treatment

Described herein are methods of treating a bacterial infection using a compound of Formula (A), (B), or (C), or a pharmaceutically acceptable salt thereof, made by any of the processes disclosed herein. In some embodiments, the compound of Formula (A), (B), or (C), or a pharmaceutically acceptable salt thereof, is used in combination with one or more antibiotics.

These methods are useful for inhibiting bacterial growth in a variety of contexts. In certain embodiments, a compound of Formula (A), (B), or (C), or a pharmaceutically acceptable salt thereof, is administered to a mammal, including a human to prevent the growth of beta-lactam resistant bacteria in vivo. The term "resistant" is well-understood by those of ordinary skill in the art (see, e g Payne et al., *Antimicrobial Agents and Chemotherapy* 38 767-772 (1994), Hanaki et al., *Antimicrobial Agents and Chemotherapy* 30 1120-1126 (1995)).

In some embodiments, the infection that is treated or prevented comprises a bacteria that includes *Elizabethkingia meningoseptica, Pseudomonas aeruginosa, Pseudomonas fluorescens, Pseudomonas acidovorans, Pseudomonas alcaligenes, Pseudomonas putida, Stenotrophomonas maltophilia, Burkholderia cepacia, Aeromonas hydrophilia, Escherichia coli, Citrobacter freundii, Salmonella typhimurium, Salmonella typhi, Salmonella paratyphi, Salmonella enteritidis, Shigella dysenteriae, Shigella flexneri, Shigella sonnei, Enterobacter cloacae, Enterobacter aerogenes, Klebsiella pneumoniae, Klebsiella oxytoca, Serratia marcescens, Francisella tularensis, Morganella morganii, Proteus mirabilis, Proteus vulgaris, Providencia alcalfaciens, Providencia rettgeri, Providencia stuartii, Acinetobacter baumannii, Acinetobacter calcoaceticus, Acinetobacter haemolyticus, Yersinia enterocolitica, Yersinia pestis, Yersinia pseudotuberculosis, Yersinia intermedia, Bordetella pertussis, Bordetella parapertussis, Bordetella bronchiseptica, Haemophilus influenzae, Haemophilus parainfluenzae, Haemophilus haemolyticus, Haemophilus parahaemolyticus, Haemophilus ducreyi, Pasteurella multocida, Pasteurella haemolytica, Branhamella catarrhalis, Helicobacter pylori, Campylobacter fetus, Campylobacter jejuni, Campylobacter coli, Borrelia burgdorferi, Vibrio cholerae, Vibrio parahaemolyticus, Legionella pneumophila, Listeria monocytogenes, Neisseria gonorrhoeae, Neisseria meningitidis, Kingella, Moraxella, Gardnerella vaginalis, Bacteroides fragilis, Bacteroides distasonis, Bacteroides* 3452A homology group, *Bacteroides vulgatus, Bacteroides ovalus, Bacteroides thetaiotaomicron, Bacteroides uniformis, Bacteroides eggerthii, Bacteroides splanchnicus, Clostridium difficile, Mycobacterium tuberculosis, Mycobacterium avium, Mycobacterium intracellulare, Mycobacterium leprae, Corynebacterium diphtheriae, Corynebacterium ulcerans, Streptococcus pneumoniae, Streptococcus agalactiae, Streptococcus pyogenes, Enterococcus faecalis, Enterococcus faecium, Staphylococcus aureus, Staphylococcus epidermidis, Staphylococcus saprophyticus, Staphylococcus intermedius, Staphylococcus hyicus* subsp. *hyicus, Staphylococcus haemolyticus, Staphylococcus hominis*, or *Staphylococcus saccharolyticus.*

In some embodiments, the infection that is treated or prevented comprises a bacteria that includes *Elizabethkingia meningoseptica, Pseudomonas aeruginosa, Pseudomonas fluorescens, Stenotrophomonas maltophilia, Escherichia coli, Citrobacter freundii, Salmonella typhimurium, Salmonella typhi, Salmonella paratyphi, Salmonella enteritidis, Shigella dysenteriae, Shigella flexneri, Shigella sonnei, Enterobacter cloacae, Enterobacter aerogenes, Klebsiella pneumoniae, Klebsiella oxytoca, Serratia marcescens, Acinetobacter calcoaceticus, Acinetobacter haemolyticus, Yersinia enterocolitica, Yersinia pestis, Yersinia pseudotuberculosis, Yersinia intermedia, Haemophilus influenzae, Haemophilus parainfluenzae, Haemophilus haemolyticus, Haemophilus parahaemolyticus, Helicobacter pylori, Campylobacter fetus, Campylobacter jejuni, Campylobacter coli, Vibrio cholerae, Vibrio parahaemolyticus, Legionella pneumophila, Listeria monocytogenes, Neisseria gonorrhoeae, Neisseria meningitidis, Moraxella, Bacteroides fragilis, Bacteroides vulgatus, Bacteroides ovalus, Bacteroides thetaiotaomicron, Bacteroides unformis, Bacteroides eggerthii*, or *Bacteroides splanchnicus.*

In another aspect provided herein are methods of treating a bacterial infection, which method comprises administering to a subject a pharmaceutical composition comprising a compound of Formula (A), (B), or (C), or a pharmaceutically acceptable salt thereof, and a pharmaceutically acceptable excipient. In some embodiments, the bacterial infection is an upper or lower respiratory tract infection, a urinary tract infection, an intra-abdominal infection, or a skin infection.

In certain embodiments, the bacterial infection is complicated intra-abdominal infection (including peritonitis and abscess), complicated urinary tract infection (including pyelonephritis), uncomplicated urinary tract infections (including cystitis), pneumonia, genitourinary infection (including urethritis, cervicitis, and pelvic inflammatory disease), uncomplicated skin and skin structure infection, complicated skin and skin structure infection (including diabetic foot infection) and bone infections (including osteomyelitis).

In certain embodiments, the bacterial infection is lower respiratory tract infection (including bronchitis, acute bacterial exacerbations of chronic bronchitis (ABECB), community acquired bacterial pneumonia, hospital acquired bacterial pneumonia including ventilated hospital-acquired pneumonia, and ventilator-associated pneumonia).

In certain embodiments, the bacterial infection is an upper respiratory tract infection including, acute bacterial otitis media, sinusitis, pharyngitis, or tonsillitis.

In certain embodiments, the bacterial infection is, enteritis or gastroenteritis, gonorrhea, meningitis, or Lyme disease.

In some embodiments, the antibiotic is a beta-lactam antibiotic. In some embodiments, the beta-lactam antibiotic is a penicillin, a cephalosporin, a carbapenem, a cephamycin, a monobactam, or a combination thereof.

In some embodiments, the bacterial infection is an upper or lower respiratory tract infection, a urinary tract infection, an intra-abdominal infection, or a skin infection. Penicillins include, but are not limited to, amoxicillin, ampicillin, azidocillin, azlocillin, bacampicillin, benzathine benzylpenicillin, benzathine phenoxymethylpenicillin, benzylpenicillin (G), carbenicillin, carindacillin, clometocillin, cloxacillin, dicloxacillin, epicillin, flucloxacillin, hetacillin, mecillinam, metampicillin, meticillin, mezlocillin, nafcillin, oxacillin, penamecillin, pheneticillin, phenoxymethylpenicillin (V), piperacillin, pivampicillin, pivmecillinam, procaine benzylpenicillin, propicillin, sulbenicillin, talampicillin, temocillin, ticarcillin. Penems include, but are not limited to, faropenem. Carbapenems include, but are not limited to, biapenem, ertapenem, doripenem, imipenem, meropenem, panipenem. Cephalosprins/Cephamycins include, but are not limited to, cefacetrile, cefaclor, cefadroxil, cefalexin, cefaloglycin, cefalonium, cefaloridine, cefalotin, cefamandole, cefapirin, cefatrizine, cefazaflur, cefazedone, cefazolin, cefbuperazone, cefcapene, cefdaloxime, cefdinir, cefditoren, cefepime, cefetamet, cefixime, cefmenoxime, cefmetazole, cefminox, cefodizime, cefonicid, cefoperazone, ceforanide, cefotaxime, cefotetan, cefotiam, cefovecin, cefoxitin, cefozopran, cefpimizole, cefpiramide, cefpirome, cefpodoxime, cefprozil, cefquinome, cefquinome, cefradine, cefroxadine, cefsulodin, ceftaroline fosamil, ceftazidime, cefteram, ceftezole, ceftibuten, ceftiofur, ceftiolene, ceftizoxime, ceftobiprole, ceftriaxone, cefuroxime, cefuzonam, flomoxef, latamoxef, loracarbef. Monobactams include, but are not limited to, aztreonam, carumonam, nocardicin A, tigemonam.

In some embodiments, the beta-lactam antibiotic is cefepime, or a pharmaceutically acceptable salt thereof. In some embodiments, the beta-lactam antibiotic is ceftibuten, or a pharmaceutically acceptable salt thereof.

EXAMPLES

All chemicals, reagents, and solvents were purchased from commercial sources when available and used without further purification.

The examples and embodiments described herein are for illustrative purposes only and in some embodiments, various modifications or changes are to be included within the purview of disclosure and scope of the appended claims.

Example 1

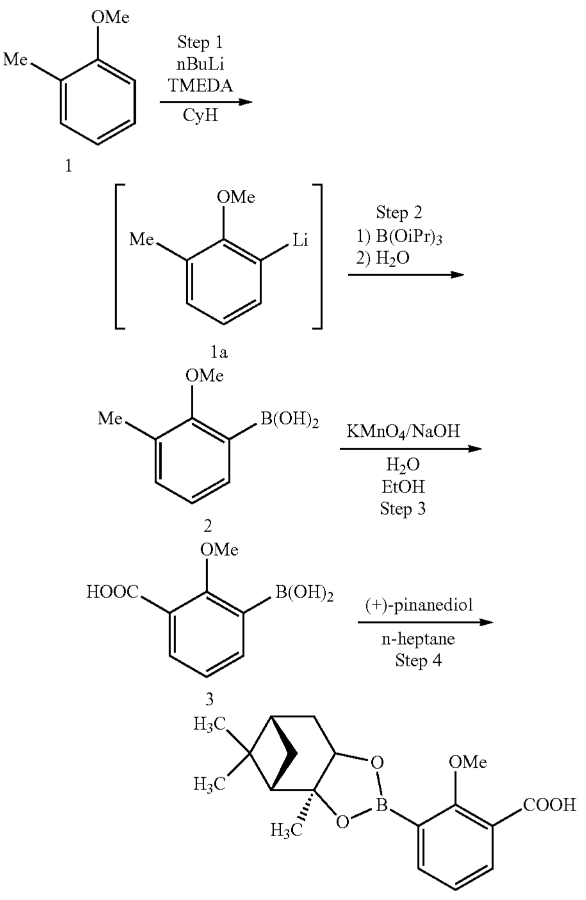

1

1a

2

3

4

Step 1 and 2—Borylation of 2-Methylanisole

The scale up was started using 40 kg (324 mol, 1 eq) 2-methylanisole (1), 50 kg TMEDA (1.3 eq) and 60 kg cyclohexane. n-Butyllithium solution (23% in hexanes, 115 kg, 1.3 eq) was added at 5-10° C. and after complete addition the line was rinsed with 30 kg cyclohexane. After 1 h at max. 10° C., in process control (IPC) by HPLC with UV/Vis detection showed 20% area unreacted 2-methylanisole (peak at 10 min). The mixture was stirred at 5-20° C. for approx. 6 h total. At this point, IPC showed 10% area residual 2-methylanisole.

The batch was cooled to −75° C. and MTBE (230 kg) was added during the cooling period at <−30° C. Triisopropyl borate (90 kg, 1.5 eq) was added at <−70° C. and the batch was slowly warmed to −20° C.

At this temperature the mixture was transferred to the quench reactor containing 15% aqueous HCl (315 kg). IPCs showed residual 2-methylanisole at 6% area level.

Subsequently, phases were separated, the organic layer was combined with water (240 kg) and 33% NaOH (53 kg) and layers were separated again. IPC showed no significant product content in the organic layer.

The aqueous product solution was acidified and stirred for 2 h at <5° C. A sample was taken and filtered in the lab showing approx. 1% wt product content in the mother liquor and 99.7% area purity for the solid product. Accordingly, the batch was released for filtration.

The product (2, 48.5 kg; LOD: 21%) was additionally slurried with water (280 kg), filtered and the cake was washed with water (50 kg). The damp product resulting from this wash showed the expected purity (99.9% area).

42 kg of damp intermediate 2 was obtained. A sample (27 g) was dried in the lab overnight showing loss on drying (LOD) of ~12%. The resulting dry product showed 103.6% potency by HPLC. Accordingly, yield for this step is calculated to be 38.3 kg (71%) 2-methoxy-3-methylphenylboronic acid.

Step 3—$KMnO_4$ Oxidation

Intermediate 2 (~38 kg dry product) was suspended in water (280 kg) and dissolved by addition of 33% NaOH solution (69 kg). Via solid lock, it was charged $KMnO_4$ (100 kg total) starting with 5 kg portions. The exothermic effect observed after addition of a portion was in good agreement with the expected value of approx. 0.8-1° C./kg. After addition of 30 kg, it was switched to 10 kg portions. A sample taken after 40 kg was showing the expected conversion level. Keeping the internal temperature at <35° C., the addition was completed within 18 h. On the next day, IPC showed complete (99.7% area) conversion and the reaction was quenched by addition of ethanol. After stirring for 1-2 h, a sample was filtered in the lab showing a colorless filtrate. The bulk was filtered and the $MnO_2$ cake was washed with 120 kg 1% NaOH and 50 kg water giving 530 kg combined filtrates. HPLC analysis of the filtrate showed a product assay of 7.92%, which equals 42 kg 3-carboxy-2-methoxyphenylboronic acid (93.5% of theory). The filtrate was acidified by addition of 37% sulfuric acid (121 kg) ending at pH 1.3. The slurry was cooled to 0-5° C., filtered and the filter cake was washed with water (150 kg).

Damp intermediate 3 showing LOD of 19% was isolated (42.2 kg). This corresponded to 34.2 kg pure intermediate 3 (76%). Additionally, there was an amount of product sticking to the walls of the reactor (2-3 kg). The true yield of the reaction was therefore estimated to be at least 36 kg (80%). HPLC purity of the damp intermediate 3 by in-house analysis was 99.9% with 2-anisic acid and step 1 intermediate as the only impurities detected (each less than 0.1%).

Step 4: Pinanediol Ester Formation

The pinanediol ester formation was performed in the same reactor used for isolation of intermediate 3 without cleaning. The intermediate 3 sticking to walls of the reactor in the reaction (estimated up to 3 kg; 15.3 mol). Additionally, 36.5 kg damp intermediate 3 (approx. 29.6 kg pure intermediate, 151.0 mol) and 30.0 kg (+)-pinanediol (176.2 mol, 1.1 eq) were charged. Solids were suspended in n-heptane (290 kg), the mixture was heated to reflux and water was removed by distillation. After stirring overnight, there was remaining intermediate 3 on the walls of the reactor. Additional n-heptane (210 kg) was added to increase the filling level and refluxing was continued at reduced pressure. However, there was still remaining intermediate 3, which was not taken up in n-heptane. A sample taken after crystallization showed no remaining intermediate 3. Q-NMR of the mother liquor (approx. 500 kg) showed an excess of approx. 3.8 kg unreacted pinanediol and 4.3 kg product. Based on the amount of pinanediol used, 50.9 kg of the desired product 4 was formed. Accordingly, there was approx. 46.6 kg product suspended.

The product 4 was filtered and washed with heptane (30 kg). Drying on the filter overnight provided 44.1 kg desired product (LOD: 0.04%, 88% yield based on damp product used).

After completion, the reactor was cleaned with THF showing approx. 2 kg desired product 4 and a minor amount of intermediate 3 (approx. 0.5 kg) in the wash solution.

What is claimed is:

1. A process for preparing a compound of Formula (III):

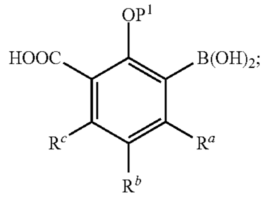

wherein:

$P^1$ is a hydroxyl protecting group; and $R^a$, $R^b$, and $R^c$ are independently hydrogen, fluoro, or chloro;

the process comprising reacting a compound of Formula (II)

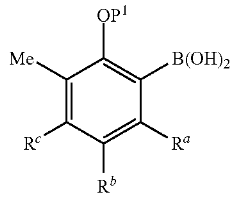

with an oxidizing agent.

2. The process of claim 1, wherein the oxidizing agent is potassium permanganate ($KMnO_4$).

3. The process of claim 1, wherein the process further comprises a base.

4. The process of claim 1, wherein the process comprises:

(i) suspending the compound of Formula (II):

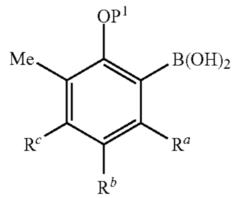

in water;

(ii) adding a base to dissolve the compound of Formula (II) in water;

(iii) adding an oxidizing agent while stirring;

(iv) stirring;

(v) adding a solvent to inactivate the excess oxidizing agent;

(vi) stirring;

(vii) filtering to get a filtrate;

(viii) acidifying the filtrate to get a slurry;

(viii) cooling the slurry; and (ix) filtering the slurry thereby obtaining the compound of Formula (III):

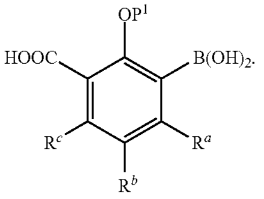

5. The process of claim 4, wherein:

(a) the base in step (ii) is sodium hydroxide;

(b) the oxidizing agent is potassium permanganate ($KMnO_4$);

(c) step (iii) is performed for about 10 h to about 20 h;

(d) the temperature is maintained at between about 20° C. and about 30° C. in step (iii);

(e) the solvent to inactivate the excess oxidizing agent is a primary or secondary alcoholic solvent;

(f) step (vi) is performed for about 10 min to about 2 h;

(g) the filtrate obtained in step (vii) is cooled to between about 0° C. and about 10° C. in step (viii) prior to acidifying;

(h) the acid used for acidifying is sulfuric acid; and/or (i) the compound of Formula (III) is obtained by filtration.

6. The process of claim 1, wherein the compound of Formula (II):

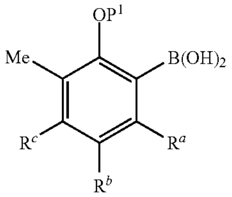

is obtained by reacting a compound of Formula (I):

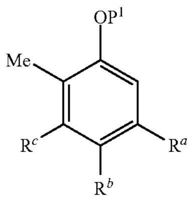

with a lithium reagent followed by a borate.

7. The process of claim 6, wherein the compound of Formula (I) is contacted with the lithium reagent to form a compound of Formula (Ia):

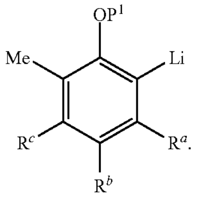

8. The process of claim 6, wherein the lithium reagent is n-BuLi.

9. The process of claim 6, wherein the borate is $B(OiPr)_3$.

10. The process of claim 6, wherein the process comprises:

(i) combining a compound of Formula (I):

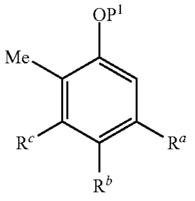

and a diamine in a solvent;

(ii) stirring;

(iii) adding a lithium reagent;

(iv) stirring;

(v) adding a borate;

(vi) quenching the reaction by adding an aqueous acidic solution;

(vii) separating the layers to obtain an organic layer;

(viii) adding an aqueous basic solution to the organic layer;

(ix) separating the layers to obtain an aqueous layer;

(x) adding an acid to the aqueous layer;

(xi) cooling to obtain a suspension;

(xii) stirring;

(xiii) filtering the suspension, thereby obtaining the compound of Formula (II):

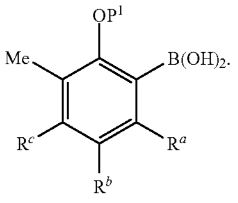

11. The process of claim 10, wherein:

(a) the diamine is TMEDA;

(b) the solvent use in step (i) is cyclohexane;

(c) the lithium reagent is nBuLi;

(d) the borate is $B(OiPr)_3$;

(e) the addition of the lithium reagent in step (iii) is done over about 1 h to about 6 h;

(f) the addition of the lithium reagent in step (iii) is done while the temperature is maintained between about 0° C. and about 20° C.;

(g) step (iv) is performed for about 2 h to about 3 h;

(h) the temperature is cooled to below −70° C. prior to the addition of the borate in step (v);

(i) the temperature is warmed to above −20° C. after to the addition of the borate in step (v);

(j) the aqueous acidic solution in step (vi) is a HCl solution;

(k) the aqueous basic solution in step (viii) is a NaOH solution; and/or (l) the cooling temperature in step (xi) is about 0° C. and about 5° C.

12. The process of claim 1, further comprising reacting the compound of Formula (III):

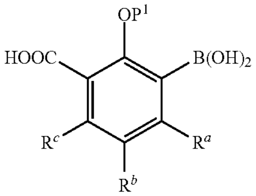

with (1S,2S,3R,5S)-(+)-pinanediol in a solvent to form a compound of Formula (IV):

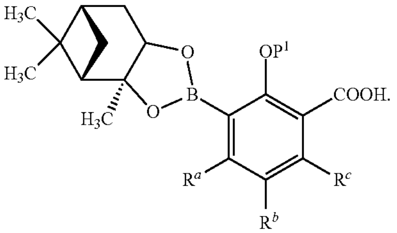

13. The process of claim 12, wherein the process comprises:

(i) mixing the compound of Formula (III), (1S,2S,3R,5S)-(+)-pinanediol, and the solvent;

(ii) heating the resulting mixture;

(iii) cooling to obtain a slurry;

(iv) filtering to obtain the compound of Formula (IV).

14. The process of claim 13, wherein:

(a) the solvent is n-heptane;

(b) the heating is done to reach reflux;

(c) step (ii) further comprises removing water; and/or (d) the cooling temperature in step (iii) is below about 60° C.

* * * * *